(12) United States Patent
Sakurada et al.

(10) Patent No.: US 10,810,814 B2
(45) Date of Patent: Oct. 20, 2020

(54) DELIVERY SYSTEM, INFORMATION PROCESSING DEVICE, CONTROL METHOD FOR INFORMATION PROCESSING DEVICE, AND NON-TRANSITORY RECORDING MEDIUM HAVING PROGRAM STORED THEREIN

(71) Applicant: TOYOTA JIDOSHA KABUSHIKI KAISHA, Toyota-shi (JP)

(72) Inventors: Shin Sakurada, Toyota (JP); Koichi Ando, Nagoya (JP); Mutsumi Matsuura, Okazaki (JP); Masato Endo, Nagakute (JP); Koki Fujita, Suginami-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/210,040

(22) Filed: Dec. 5, 2018

(65) Prior Publication Data

US 2019/0206170 A1 Jul. 4, 2019

(30) Foreign Application Priority Data

Dec. 28, 2017 (JP) .................. 2017-255023

(51) Int. Cl.
*G07C 9/00* (2020.01)
*G06Q 10/08* (2012.01)

(52) U.S. Cl.
CPC ..... *G07C 9/00896* (2013.01); *G06Q 10/0833* (2013.01); *G07C 9/00309* (2013.01); *G07C 2009/00468* (2013.01)

(58) Field of Classification Search
None
See application file for complete search history.

(56) References Cited

U.S. PATENT DOCUMENTS

| 9,508,204 | B2 | 11/2016 | Oz et al. | |
| 2015/0074008 | A1* | 3/2015 | Guillama | G06Q 50/265 |
| | | | | 705/325 |
| 2015/0332531 | A1 | 11/2015 | Davidsson et al. | |
| 2017/0017920 | A1 | 1/2017 | Stark et al. | |
| 2018/0265293 | A1* | 9/2018 | Zuckerman | B65G 1/065 |

FOREIGN PATENT DOCUMENTS

| JP | 2006-206225 | 8/2006 |
| JP | 2009-269682 | 11/2009 |
| JP | 2015-45141 | 3/2015 |
| JP | 2017-091509 | 5/2017 |

\* cited by examiner

*Primary Examiner* — Carlos Garcia
(74) *Attorney, Agent, or Firm* — Oblon, McClelland, Maier & Neustadt, L.L.P.

(57) ABSTRACT

A delivery system includes: a first vehicle configured to deliver a delivery object to a predetermined delivery destination; a second vehicle configured to deliver the delivery object to the first vehicle; and an authentication information issuing device configured to perform at least one of first issuance control and second issuance control. The first issuance control is control of issuing first authentication information to a second user terminal. The first authentication information is information for locking and unlocking the predetermined area of the first vehicle. The second issuance control is control of issuing second authentication information to a first user terminal. The second authentication information is information for locking and unlocking the predetermined area of the second vehicle.

14 Claims, 13 Drawing Sheets

FIG. 4

| USER ID | CLASSIFICATION | NAME (CONTACT INFORMATION) | VEHICLE ID | VEHICLE NUMBER | VEHICLE MODEL | COLOR | POSITION INFORMATION | SCHEDULE |
|---|---|---|---|---|---|---|---|---|
| S001 | DELIVERY COMPANY | ○○□□ (090-xxxx-yyyy) | V001 | ... | ... | ... | ... | ... |
| S002 | GENERAL | ○○△△ (090-xxxx-yyyy) | V002 | ... | ... | ... | ... | / |
| | | | | | | | | |

FIG. 5
| LUGGAGE ID | CLASSIFICATION | DELIVERY SOURCE | DELIVERY DESTINATION | DESIGNATED DATE AND TIME |
|---|---|---|---|---|
| B001 | ... | ... | ... | ... |
| B002 | ... | ... | ... | ... |
|  |  |  |  |  |
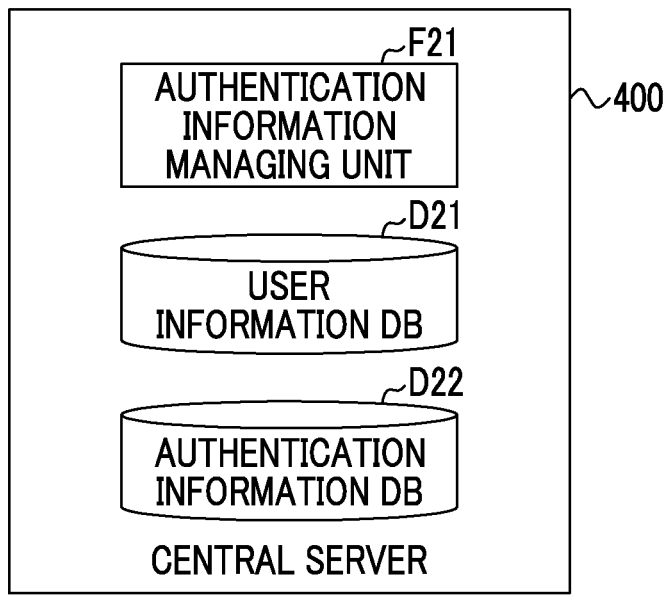
FIG. 6
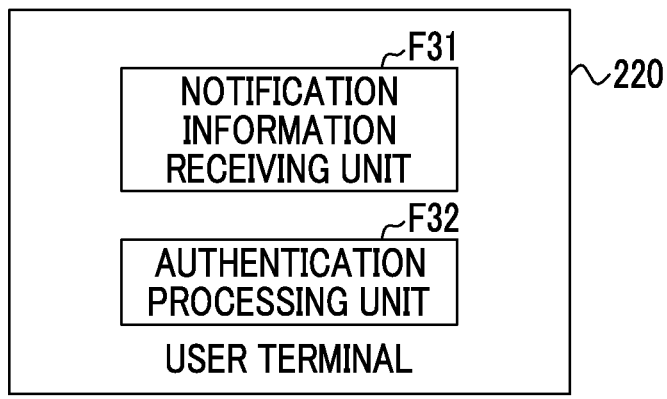
FIG. 7

DELIVERY SYSTEM, INFORMATION PROCESSING DEVICE, CONTROL METHOD FOR INFORMATION PROCESSING DEVICE, AND NON-TRANSITORY RECORDING MEDIUM HAVING PROGRAM STORED THEREIN

INCORPORATION BY REFERENCE

The disclosure of Japanese Patent Application No. 2017-255023 filed on Dec. 28, 2017 including the specification, drawings and abstract is incorporated herein by reference in its entirety.

BACKGROUND

1. Technical Field

The disclosure relates to a delivery system, an information processing device, a control method for an information processing device, and a non-transitory recording medium having a program stored therein.

2. Description of Related Art

In a system that manages a delivery route, a technique for automatically recombining delivery routes has been proposed to improve efficiency of use of a delivery vehicle (for example, see Japanese Unexamined Patent Application Publication No. 2017-091509 (JP 2017-091509 A)).

Japanese Unexamined Patent Application Publication No. 2009-269682 (JP 2009-269682 A) discloses a technique of controlling delivery itself when an abnormality in delivery has been detected.

Japanese Unexamined Patent Application Publication No. 2006-206225 (JP 2006-206225 A) discloses a technique of enabling delivery of a delivery object even when a receiver is absent by registering a luggage-receiving vehicle in which the receiver will receive the delivery object and accommodating the delivery object in a trunk of the registered luggage-receiving vehicle.

SUMMARY

In a delivery system (for example, see JP 2017-091509 A), picked-up delivery objects are gathered together in a delivery center. Accordingly, delivery vehicles that deliver luggage to delivery destinations have to move to the delivery center to pick up luggage. In such a delivery system, even when a delivery route has been appropriately adjusted, there is concern that luggage will not be able to be efficiently delivered depending on the location of the delivery center. In this way, there is room for improvement in efficient delivery of luggage.

In techniques associated with trunk sharing in which a cargo compartment (a trunk) of a vehicle is commonly used (shared), for example, the above-mentioned delivery of a delivery object is possible by permitting a third party other than a user of the vehicle to access the cargo compartment of the vehicle. Here, the inventor invented a delivery system using the techniques associated with trunk sharing. "Trunk-sharing" is not limited to sharing of a cargo compartment of a vehicle and includes a form of sharing a predetermined area of a vehicle.

According to a first aspect of the disclosure, there is provided a delivery system in which a predetermined area of a vehicle is used as a pickup and delivery place of a delivery object while the delivery object is being delivered to a predetermined delivery destination. The delivery system includes: a first vehicle configured to deliver the delivery object to the predetermined delivery destination; a second vehicle configured to deliver the delivery object to the first vehicle; and an authentication information issuing device configured to perform at least one of first issuance control and second issuance control. The first issuance control is control of issuing first authentication information to a second user terminal included in a second user device which is able to be used by a user of the second vehicle. The first authentication information is information for locking and unlocking a predetermined area of the first vehicle. The second issuance control is control of issuing second authentication information to a first user terminal included in a first user device which is able to be used by a user of the first vehicle. The second authentication information is information for locking and unlocking a predetermined area of the second vehicle.

According to this configuration, while a delivery object is being delivered to a predetermined delivery destination, the first vehicle and the second vehicle gather at a predetermined meeting place at a predetermined meeting time. The predetermined meeting place and the predetermined meeting time may be a predetermined place and a predetermined time or may be determined, for example, based on traveling positions of the first vehicle and the second vehicle. The meeting time may be a time period having a certain period. The first user device which is able to be used by the user of the first vehicle (hereinafter referred to as a first user) and the second user device which is able to be used by the user of the second vehicle (hereinafter referred to as a second user) are onboard units of the vehicles (for example, navigation systems) or mobile terminals of the user or the like.

In the vehicles which have gathered at the predetermined meeting place, a delivery object is delivered from the second vehicle to the first vehicle. At this time, the second user can lock and unlock a predetermined area of the first vehicle using authentication information issued to the second user terminal by the authentication information issuing device. Alternatively, the first user can lock and unlock a predetermined area of the second vehicle using authentication information issued to the first user terminal by the authentication information issuing device. A predetermined area of a vehicle is, for example, a cargo compartment of the vehicle. However, the disclosure is not limited thereto, and the predetermined area of a vehicle may be a passenger compartment of the vehicle. The first user terminal and the second user terminal are mobile terminals carried by the users. Accordingly, even when the first user is away from the vehicle, the second user can move the delivery object from the second vehicle to the first vehicle by accessing the predetermined area of the first vehicle using the authentication information. Alternatively, even when the second user is away from the vehicle, the first user can move the delivery object from the second vehicle to the first vehicle by accessing the predetermined area of the second vehicle using the authentication information. That is, by allowing the users to share a predetermined area (a trunk) of a vehicle, a delivery object is smoothly delivered from the second vehicle to the first vehicle. Since a third party not having authentication information cannot access the predetermined areas of the first vehicle and the second vehicle, security of the delivery object stored in the first vehicle or the second vehicle is maintained. Accordingly, since a delivery object is smoothly delivered from the second vehicle to the first vehicle at a predetermined meeting place regardless of a location of a delivery center, it is possible to efficiently deliver luggage.

The delivery system may further include a notification device configured to notify the first user device and the second user device of predetermined information such that the first vehicle and the second vehicle are able to gather at a predetermined meeting place. The predetermined information may include position information of the predetermined meeting place. Here, the predetermined information may include, for example, a meeting time in addition to the position information of the predetermined meeting place. By notifying the first user device and the second user device of such information, the first vehicle and the second vehicle can appropriately gather at the predetermined meeting place.

In the delivery system, the notification device may be configured to notify the predetermined information based on position information of current locations of the first vehicle and the second vehicle. According to this configuration, the notification device can set the position of the predetermined meeting place to, for example, a position at which a distance from the current location of the first vehicle to the predetermined meeting place and a distance from the current location of the second vehicle to the predetermined meeting place are substantially equal to each other and notify the predetermined information. The notification device may set the position of the predetermined meeting place to, for example, a position at which a distance from the current location of one vehicle to the predetermined meeting place is shorter than a distance from the current location of the other vehicle to the predetermined meeting place and notify the predetermined information. In this way, by notifying the predetermined information based on the position information of the current locations of the first vehicle and the second vehicle, the first vehicle and the second vehicle can appropriately gather at the predetermined meeting place.

In the delivery system, the notification device may be configured to notify the predetermined information based on delivery schedules of the delivery object in the first vehicle and the second vehicle. According to this configuration, when a delivery route of a delivery object in the first vehicle and a delivery route of a delivery object in the second vehicle include the same position and the vehicles pass through the position in a predetermined time period, the notification device can notify the predetermined information based on position information of the position (determine the predetermined meeting place based on the position information of the position). Even when the delivery route of a delivery object in the first vehicle and the delivery route of a delivery object in the second vehicle do not include the same position but a distance between the vehicles becomes relatively small, for example, in a predetermined time period, the notification device can notify the predetermined information based on position information of positions through which the vehicles pass in the time period. In this way, by notifying the predetermined information based on the delivery schedules of a delivery object in the first vehicle and the second vehicle, the first vehicle and the second vehicle can appropriately gather at the predetermined meeting place.

In the delivery system, the authentication information issuing device may be configured to issue the second authentication information to first user terminals of the users of a plurality of the first vehicles when the second vehicle delivers delivery objects to a plurality of the first vehicles. The authentication information issuing device may be configured to issue the first authentication information to the second user terminal when the second vehicle delivers delivery objects to a plurality of the first vehicles. In the delivery system, the authentication information issuing device may be configured to issue the first authentication information to second user terminals of the users of a plurality of the second vehicles when the first vehicle picks up delivery objects from a plurality of the second vehicles. The authentication information issuing device may be configured to issue the second authentication information to the first user terminal when the first vehicle picks up delivery objects from a plurality of the second vehicles. According to these configurations, since a delivery object can be smoothly delivered from the second vehicle to the first vehicle at the predetermined meeting place, it is possible to efficiently deliver a delivery object.

The delivery system may further include: a delivery request providing device configured to provide a request for delivery of the delivery object to the predetermined delivery destination as a delivery request to the users of a plurality of the first vehicles; a response acquiring device configured to acquire a response to the delivery request provided by the delivery request providing device from the users of the plurality of the first vehicles; and a selection device configured to extract users of the first vehicles having transmitted a response indicating agreement about the delivery request among the responses acquired by the response acquiring device and to select a designated first vehicle which is a first vehicle to which the delivery object is actually delivered from the second vehicle among the first vehicles associated with the extracted users. The authentication information issuing device may be configured to issue third authentication information for locking and unlocking the predetermined area of the designated first vehicle selected by the selection device to the second user terminal.

According to this configuration, a user who actually requests delivery of a delivery object to a predetermined delivery destination can be appropriately selected from a plurality of the first users who use the system. For example, when a plurality of temporary users who can deliver a delivery object in only a predetermined area at a predetermined date and time is registered as users who use the delivery system, the first user can be easily secured even if the number of users who can deliver a delivery object in full time is relatively small. Accordingly, it is possible to efficiently deliver a delivery object.

The selection device may be configured to select the designated first vehicle based on position information of current locations of the first vehicle and the second vehicle. According to this configuration, the selection device can select, for example, a first vehicle relatively close to the second vehicle as a designated first vehicle. Accordingly, the first vehicle and the second vehicle can appropriately gather at the predetermined meeting place.

In the delivery system, the predetermined meeting place may be a place at which the designated first vehicle selected by the selection device is parked. According to this configuration, since the first vehicle and the second vehicle can gather without causing the first user to move the first vehicle, it is possible to improve convenience for the first user.

According to a second aspect of the disclosure, there is provided an information processing device that controls a system in which a predetermined area of a vehicle is used as a pickup and delivery place of a delivery object while the delivery object is being delivered to a predetermined delivery destination. The information processing device includes an authentication information issuing unit configured to perform at least one of first issuance control and second issuance control. The first issuance control is control of issuing first authentication information to a second user terminal included in a second user device which is able to be used by a user of a second vehicle that delivers the delivery object to a first vehicle. The first authentication information is information for locking and unlocking the predetermined area of the first vehicle that delivers the delivery object to the predetermined delivery destination. The second issuance control is control of issuing second authentication information to a first user terminal included in a first user device which is able to be used by a user of the first vehicle. The second authentication information is information for locking and unlocking the predetermined area of the second vehicle.

According to a third aspect of the disclosure, there is provided a control method for an information processing device that controls a system in which a predetermined area of a vehicle is used as a pickup and delivery place of a delivery object while the delivery object is being delivered to a predetermined delivery destination, the information processing device including an electronic control unit. The control method includes causing the electronic control unit to perform at least one of first issuance control and second issuance control. The first issuance control is control of issuing first authentication information to a second user terminal included in a second user device which is able to be used by a user of a second vehicle that delivers the delivery object to a first vehicle. The first authentication information is information for locking and unlocking the predetermined area of the first vehicle that delivers the delivery object to the predetermined delivery destination. The second issuance control is control of issuing second authentication information to a first user terminal included in a first user device which is able to be used by a user of the first vehicle. The second authentication information is information for locking and unlocking the predetermined area of the second vehicle.

According to a fourth aspect of the disclosure, there is provided a non-transitory recording medium storing a program that controls a system in which a predetermined area of a vehicle is used as a pickup and delivery place of a delivery object while the delivery object is being delivered to a predetermined delivery destination, the program causing a computer to perform at least one of a first issuance step and a second issuance step. The first issuance step is a step of issuing first authentication information to a second user terminal included in a second user device which is able to be used by a user of a second vehicle that delivers the delivery object to a first vehicle. The first authentication information is information for locking and unlocking the predetermined area of the first vehicle that delivers the delivery object to the predetermined delivery destination. The second issuance step is a step of issuing second authentication information to a first user terminal included in a first user device which is able to be used by a user of the first vehicle. The second authentication information is information for locking and unlocking the predetermined area of the second vehicle.

The above-mentioned processes or means can be freely combined unless there is technical inconsistency.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of an identification information table;

FIG. 5 is a diagram illustrating an example of a luggage information table;

FIG. 6 is a diagram illustrating a functional configuration of the central server;

FIG. 7 is a diagram illustrating a functional configuration of a user terminal;

DETAILED DESCRIPTION OF EMBODIMENTS

Figure 1:
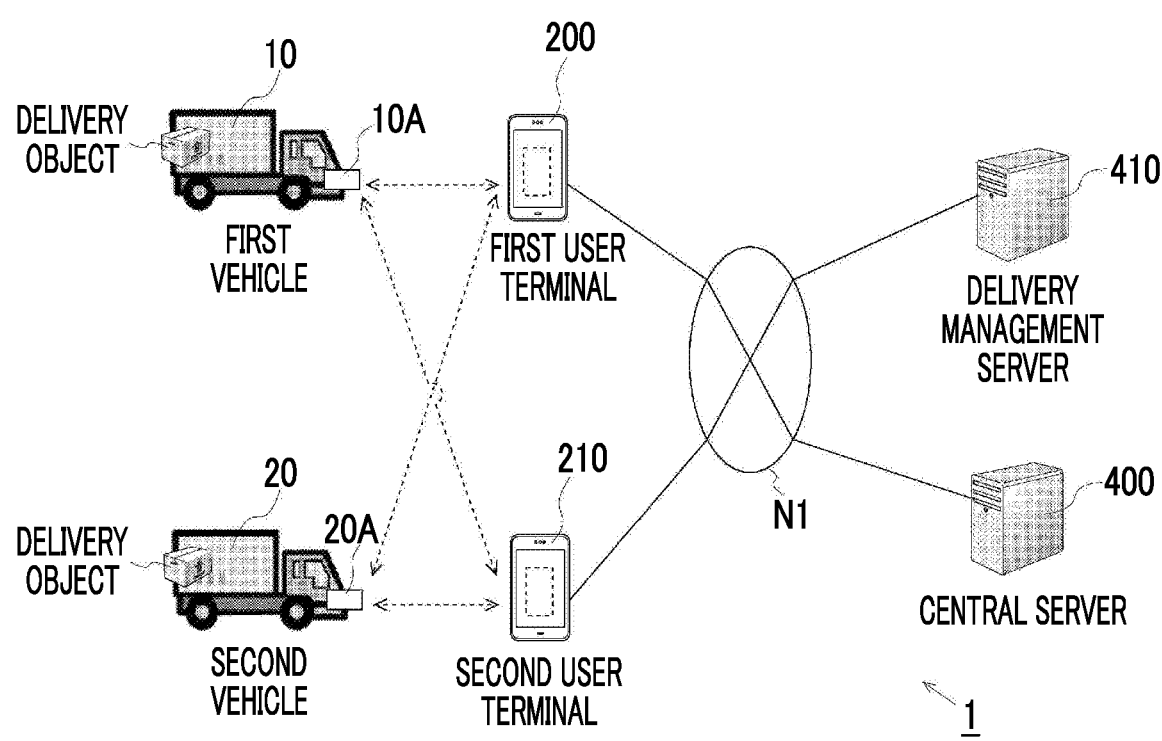
FIG. 1 is a diagram schematically illustrating a configuration of a delivery system according to an embodiment.

FIG. 1 is a diagram schematically illustrating a configuration of a delivery system according to an embodiment. The delivery system 1 is a system in which a cargo compartment (a trunk) of a vehicle is commonly used (shared) as a pickup and delivery place of a delivery object by users while the delivery object is being delivered to a predetermined delivery destination. Here, a first vehicle 10 is a vehicle that delivers a delivery object to a predetermined delivery destination and a second vehicle 20 is a vehicle that delivers a picked-up delivery object to the first vehicle 10. A user of the first vehicle 10 is referred to as a first user and a user of the second vehicle 20 is referred to as a second user.

In the example illustrated in FIG. 1, the delivery system 1 includes a first vehicle 10, a first onboard unit 10A that is installed in the first vehicle 10, a second vehicle 20, a second onboard unit 20A that is installed in the second vehicle 20, a first user terminal 200, a second user terminal 210, a central server 400, and a delivery management server 410. The first onboard unit 10A, the second onboard unit 20A, the first user terminal 200, the second user terminal 210, the central server 400, and the delivery management server 410 are connected to each other via a network N1. The first onboard unit 10A and the second onboard unit 20A are connected to the first user terminal 200 and the second user terminal 210 via a network N2 including short-range radio communication.

The delivery management server 410 includes identification information of delivery vehicles that use the delivery system 1 and identification information of users of the delivery vehicles. The delivery management server 410 may acquire a delivery schedule of a delivery object for each delivery vehicle or may acquire position information of each delivery vehicle using a GPS device included in an onboard unit of the corresponding delivery vehicle. In this embodiment, the delivery vehicles that use the delivery system 1 are the first vehicle 10 and the second vehicle 20.

The delivery management server 410 can notify the user terminals of the users of the vehicles of predetermined information including position information of a predetermined meeting place such that a delivery object is delivered from the second vehicle 20 to the first vehicle 10 while the delivery object is being delivered to a predetermined delivery destination. The delivery management server 410 may notify the predetermined information based on position information of current locations of the first vehicle 10 and the second vehicle 20 or may notify the predetermined information based on delivery schedules of delivery objects in the first vehicle 10 and the second vehicle 20 as will be described later.

The delivery management server 410 transmits identification information of the first vehicle 10 and the second vehicle 20 and identification information of the users of the vehicles to the central server 400. The delivery management server 410 requests the central server 400 to transmit authentication information for locking and unlocking the first vehicle 10 to the second user terminal 210 and/or to transmit authentication information for locking and unlocking the second vehicle 20 to the first user terminal 200.

The central server 400 transmits the authentication information for the first vehicle 10 to the second user terminal 210 and/or transmits the authentication information for the second vehicle 20 to the first user terminal 200 based on the information transmitted from the delivery management server 410. Then, the second user can deliver a delivery object to the first vehicle 10 by locking and unlocking the first vehicle 10 using the authentication information received by the second user terminal 210 and/or the first user can pick up the delivery object from the second vehicle 20 by locking and unlocking the second vehicle 20 using the authentication information received by the first user terminal 200. By sharing the trunk in this way, a delivery object is smoothly delivered from the second vehicle 20 to the first vehicle 10. The authentication information may be transmitted from the central server 400 to the delivery management server 410 and then be transmitted from the delivery management server 410 to the user terminal. Here, the authentication information is digital information which is used to allow an onboard unit to perform locking and unlocking of the vehicle by being transmitted from the user terminal to the onboard unit and being subjected to authentication by the onboard unit. Locking and unlocking of a vehicle is a process of locking and unlocking a door of a cargo compartment of the vehicle.

Figure 2:
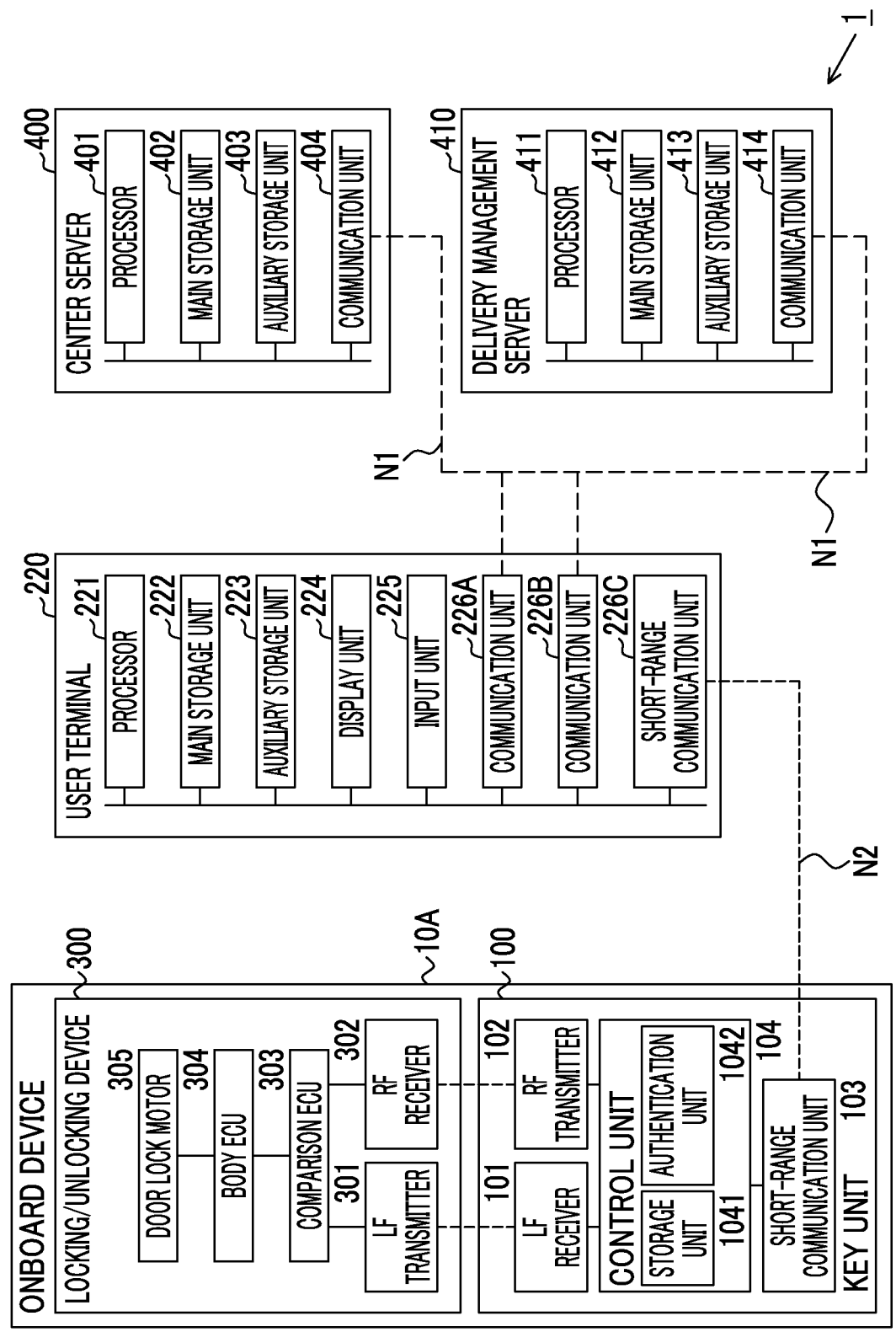
FIG. 2 is a diagram illustrating hardware configurations of an onboard unit, user terminals, a central server, and a delivery management server.

FIG. 2 is a diagram illustrating hardware configurations of an onboard unit, a user terminal, the central server 400, and the delivery management server 410. The first onboard unit 10A and the second onboard unit 20A have the same hardware configuration and thus the first onboard unit 10A will be described below as an example. A key unit 100 includes the same radio interface as an electronic key of a smart key, and can perform locking and unlocking of the first vehicle 10 without using any physical key by communicating with an existing locking/unlocking device 300 of the first onboard unit 10A. The key unit 100 performs short-range radio communication with a mobile terminal such as the first user terminal 200 or the second user terminal 210 (hereinafter referred to as the second user terminal 210 or the like) and determines whether it serves as an electronic key for the first vehicle 10 based on a result of authentication for the second user terminal 210 or the like.

Authentication information which is transmitted from the second user terminal 210 or the like to the key unit 100 is compared with authentication information which is stored in advance in the key unit 100. When the authentication has succeeded, the second user terminal 210 or the like is authenticated. When the second user terminal 210 or the like is authenticated, the key unit 100 transmits an ID of an electronic key (hereinafter referred to as a key ID) for the first vehicle 10 which is stored in advance in the key unit 100 and correlated with the authentication information to the locking/unlocking device 300 along with a locking/unlocking signal. The locking/unlocking device 300 locks and unlocks the first vehicle 10 when the key ID received from the key unit 100 coincides with a key ID which is stored in advance in the locking/unlocking device 300. The key ID stored in advance in the key unit 100 may be encrypted with the authentication information. In this case, when the authentication for the second user terminal 210 or the like has succeeded, the key unit 100 can decrypt the key ID with the authentication information and then transmit the decrypted key ID to the locking/unlocking device 300.

The first user terminal 200 of the first user who is a user of the first vehicle 10 stores master authentication information which can be authenticated by the key unit 100, and the first user can lock and unlock the first vehicle 10 at any time. On the other hand, at the time of access to the cargo compartment of the first vehicle 10, the second user terminal 210 receives authentication information for locking and unlocking the first vehicle 10 from the central server 400 or the delivery management server 410. The key unit 100 and the locking/unlocking device 300 operate with electric power which is supplied from a battery mounted in the first vehicle 10.

The locking/unlocking device 300 is a device that locks and unlocks a door of the first vehicle 10 and is an existing device constituting a part of a smart key system. Specifically, the user of the first vehicle 10 locks and unlocks the door of the first vehicle 10 in accordance with a locking signal and an unlocking signal which are transmitted from an electronic key of a smart key which is carried by the user of the first vehicle 10 using radio waves of a radio frequency (hereinafter referred to as RF) band. The locking/unlocking device 300 also has a function of transmitting radio waves of a low frequency (hereinafter referred to as LF) band for detecting the electronic key of the smart key.

In this embodiment, instead of the electronic key of the smart key which is carried by the user, the key unit 100 may control locking and unlocking of the door of the first vehicle 10 by transmitting and receiving radio waves of an RF band and an LF band to and from the locking/unlocking device 300. In the following description, unless otherwise mentioned, a communication destination of the locking/unlocking device 300 is limited to the key unit 100.

The locking/unlocking device 300 includes an LF transmitter 301, an RF receiver 302, a comparison ECU 303, a body ECU 304, and a door lock motor 305. The LF transmitter 301 is means that transmits radio waves of an LF band (for example, 100 KHz to 300 KHz) for detecting (polling) the key unit 100. The LF transmitter 301 is incorporated, for example, in a center console or in the vicinity of a steering wheel in the passenger compartment. The RF receiver 302 is means that receives radio waves of an RF band (for example, 100 MHz to 1 GHz) transmitted from the key unit 100. The RF receiver 302 is incorporated at any position in the passenger compartment.

The comparison ECU 303 is a computer that performs control for locking and unlocking the door of the first vehicle 10 based on a signal (a locking signal or an unlocking signal) transmitted from the key unit 100 using radio waves of an RF band. The comparison ECU 303 is constituted, for example, by a microcomputer. In the following description, the locking signal and the unlocking signal are collectively referred to as a locking/unlocking signal. The term, locking/unlocking signal, represents at least one of the locking signal and the unlocking signal.

The comparison ECU 303 authenticates whether the locking/unlocking signal transmitted from the key unit 100 has been transmitted from a rightful device. Specifically, the comparison ECU 303 determines whether the key ID included in the locking/unlocking signal coincides with a key ID stored in advance in a storage unit of the comparison ECU 303. Then, the comparison ECU 303 transmits an unlocking command or a locking command to the body ECU 304 based on the determination result. The unlocking command or the locking command is transmitted via an onboard network such as a controller area network (CAN).

The body ECU 304 is a computer that executes body control of the first vehicle 10. The body ECU 304 has a function of unlocking and locking the door of the first vehicle 10 by controlling the door lock motor 305 based on the unlocking command or the locking command received from the comparison ECU 303. The door lock motor 305 is an actuator that locks and unlocks the door of the first vehicle 10 (which includes a trunk door in addition to a boarding door or a rear gate). The door lock motor 305 operates based on a signal transmitted from the body ECU 304. The comparison ECU 303 and the body ECU 304 may be embodied as a single body.

The key unit 100 will be described now. The key unit 100 is a device that is disposed at a predetermined position (for example, inside a glove box) of the passenger compartment of the first vehicle 10. The key unit 100 has a function of authenticating the second user terminal 210 or the like by performing short-range radio communication with the second user terminal 210 or the like and a function of transmitting a locking/unlocking signal using radio waves of an RF band based on the authentication result. The key unit 100 includes an LF receiver 101, an RF transmitter 102, a short-range communication unit 103, and a control unit 104.

The LF receiver 101 is means that receives a polling signal which is transmitted from the locking/unlocking device 300 using radio waves of an LF band. The LF receiver 101 includes an antenna for receiving radio waves of an LF band (hereinafter referred to as an LF antenna). The RF transmitter 102 is means that transmits a locking/unlocking signal to the key unit 100 using radio waves of an RF band.

The short-range communication unit 103 is means that communicates with the second user terminal 210 or the like carried by a user. The short-range communication unit 103 performs communication in a short range (at a distance at which communication can be performed between the interior and the exterior of the vehicle) using a predetermined radio communication standard.

In this embodiment, the short-range communication unit 103 performs data communication based on a Bluetooth (registered trademark) Low Energy standard (hereinafter referred to as BLE). BLE is a low-energy communication standard using Bluetooth, and is characterized in that communication can be started immediately when a communication partner is detected without requiring pairing between devices. In this embodiment, BLE is exemplified, but other radio communication standards can also be used. For example, near field communication (NFC), ultra wideband (UWB), and WiFi (registered trademark) may be used.

The control unit 104 is a computer that performs short-range radio communication with the second user terminal 210 or the like via the short-range communication unit 103 and performs control for authenticating the second user terminal 210 or the like and control for transmitting a locking/unlocking signal based on the authentication result. The control unit 104 is constituted, for example, by a microcomputer.

The control unit 104 includes a storage unit 1041 and an authentication unit 1042. A control program for controlling the key unit 100 is stored in the storage unit 1041. The control unit 104 may realize various functional units including the authentication unit 1042 by causing a CPU (not illustrated) to execute the control program stored in the storage unit 1041. For example, the control unit 104 realizes a function of receiving a polling signal transmitted as radio waves of an LF band from the locking/unlocking device 300 via the LF receiver 101, a function of transmitting a locking/unlocking signal as radio waves of an RF band to the locking/unlocking device 300 via the RF transmitter 102, a function of processing communication with the second user terminal 210 or the like which is performed by the short-range communication unit 103, and a function of generating a locking/unlocking signal when authentication of the second user terminal 210 or the like by the authentication unit 1042 has succeeded.

The authentication unit 1042 authenticates the second user terminal 210 or the like based on authentication information included in a locking request or an unlocking request (hereinafter collectively referred to as a locking/unlocking request) transmitted from the second user terminal 210 or the like. Specifically, the authentication unit 1042 compares the authentication information transmitted from the second user terminal 210 or the like with the authentication information stored in the storage unit 1041 and determines that the authentication has succeeded when they satisfy a predetermined relationship. When both pieces of authentication information do not satisfy the predetermined relationship, the authentication unit 1042 determines that the authentication has failed. Here, the predetermined relationship includes a case in which the authentication information stored in the storage unit 1041 coincides with the authentication information transmitted from the second user terminal 210 or the like, a case in which results of predetermined processes such as encryption and decryption using the two pieces of authentication information coincide with each other, and a case in which a result of decryption on one of the two pieces of authentication information coincides with that on the other thereof. When the authentication of the second user terminal 210 or the like by the authentication unit 1042 has succeeded, a locking/unlocking signal generated in response to a request received from the second user terminal 210 or the like is transmitted to the locking/unlocking device 300 via the RF transmitter 102.

The key unit 100 transmits the key ID along with the locking/unlocking signal to the locking/unlocking device 300. The key ID may be stored in the key unit 100 in a plaintext state in advance or may be stored in a state in which it has been encrypted using a cipher specific to the second user terminal 210 or the like. When the key ID is stored in the encrypted state, the encrypted key ID may be decrypted using the authentication information transmitted from the second user terminal 210 or the like to acquire the original key ID.

The delivery management server 410 has a general configuration of a computer. The delivery management server 410 includes a processor 411, a main storage unit 412, an auxiliary storage unit 413, and a communication unit 414. These elements are connected to each other via a bus. The main storage unit 412 and the auxiliary storage unit 413 are computer-readable recording mediums. The hardware configuration of the computer is not limited to the example illustrated in FIG. 2, and omission, substitution, or addition of elements may be appropriately performed thereon.

The delivery management server 410 can realize functions matching a predetermined purpose by causing the processor 411 to load a program stored in a recording medium into a work area of the main storage unit 412 and to execute the loaded program and controlling the constituent units or the like through execution of the program.

The processor 411 is, for example, a central processing unit (CPU) or a digital signal processor (DSP). The processor 411 controls the delivery management server 410 and performs various information processing operations. The main storage unit 412 includes, for example, a random access memory (RAM) or a read only memory (ROM). The auxiliary storage unit 413 is, for example, an erasable programmable ROM (EPROM) or a hard disk drive (HDD). The auxiliary storage unit 413 can include a removable medium, that is, a portable recording medium. The removable medium is, for example, a universal serial bus (USB) memory or a disk recording medium such as a compact disc (CD) or a digital versatile disc (DVD).

The auxiliary storage unit 413 stores various programs, various types of data, and various tables on a recording medium in a readable and writable manner. An operating system (OS), various programs, various tables, and the like are stored in the auxiliary storage unit 413. Information stored in the auxiliary storage unit 413 may be stored in the main storage unit 412. Information stored in the main storage unit 412 may be stored in the auxiliary storage unit 413.

The communication unit 414 is connected to another device and controls communication between the delivery management server 410 and the other device. The communication unit 414 is, for example, a local area network (LAN) interface board and a radio communication circuit for radio communication. The LAN interface board or the radio communication circuit is connected to the network N1 such as the Internet which is a public communication network.

A sequence of processes which is performed by the delivery management server 410 may be performed by hardware or may be performed by software.

Similarly to the delivery management server 410, the central server 400 includes a processor 401, a main storage unit 402, an auxiliary storage unit 403, and a communication unit 404. The processor 401, the main storage unit 402, the auxiliary storage unit 403, and the communication unit 404 are the same as the processor 411, the main storage unit 412, the auxiliary storage unit 413, and the communication unit 414 of the delivery management server 410 and thus description thereof will not be repeated.

The first user terminal 200 and the second user terminal 210 are small computers such as a smartphone, a mobile phone, a tablet terminal, a personal information terminal, or a wearable computer (such as a smart watch). The first user terminal 200 and the second user terminal 210 have the same hardware configuration and thus these user terminals will be collectively referred to as a user terminal 220 in the following description.

The user terminal 220 includes a processor 221, a main storage unit 222, an auxiliary storage unit 223, a display unit 224, an input unit 225, a communication unit 226A, a communication unit 226B, and a short-range communication unit 226C. The processor 221, the main storage unit 222, and the auxiliary storage unit 223 are the same as the processor 411, the main storage unit 412, and the auxiliary storage unit 413 of the delivery management server 410 and thus description thereof will not be repeated. The display unit 224 is, for example, a liquid crystal display (LCD) or an electroluminescence (EL) panel. The input unit 225 includes a touch panel and push buttons. The input unit 225 may include a video or image input unit such as a camera or a sound input unit such as a microphone. The communication unit 226A is a communication circuit that accesses the Internet, for example, via a mobile phone network with a base station as a terminal. The communication unit 226B is a communication circuit that accesses the Internet, for example, via a wireless or wired LAN and performs data communication with the delivery management server 410. The short-range communication unit 226C is a communication circuit that performs short-range communication in accordance with a predetermined communication standard. Examples of the predetermined communication standard include BLE and NFC.

The network N1 may be, for example, a global public communication network such as the Internet, and a wide area network (WAN) or other communication networks may be employed. The network N1 may include a telephone communication network for mobile phones and the like and a wireless communication network such as WiFi. The user terminal 220 can access the Internet via the telephone communication network for mobile phones and the like or a wireless communication network such as WiFi. The network N2 includes a communication network for BLE or the like via which the user terminal 220 communicates with the first onboard unit 10A. The user terminal 220 can communicate with the first onboard unit 10A by BLE communication.

Figure 3:
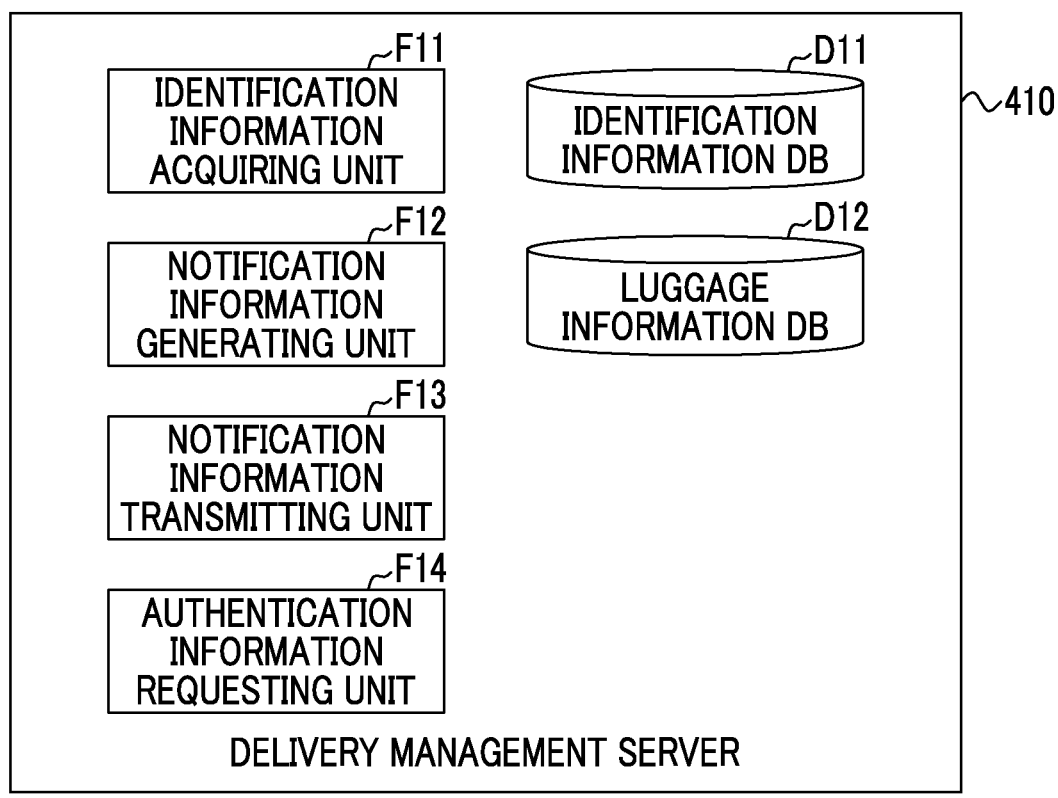
FIG. 3 is a first diagram illustrating a functional configuration of the delivery management server.

FIG. 3 is a diagram illustrating a functional configuration of the delivery management server. The delivery management server 410 includes an identification information acquiring unit F11, a notification information generating unit F12, a notification information transmitting unit F13, an authentication information requesting unit F14, an identification information database D11, and a luggage information database D12. The processor 411 of the delivery management server 410 performs processes of the identification information acquiring unit F11, the notification information generating unit F12, the notification information transmitting unit F13, and the authentication information requesting unit F14 by executing a computer program in the main storage unit 412. One of the functional units or some of the processes may be embodied by a hardware circuit.

The identification information database D11 and the luggage information database D12 are constructed by causing a program of a database management system (DBMS) which is executed by the processor 411 to manage data stored in the auxiliary storage unit 413. The identification information database D11 and the luggage information database D12 are, for example, relational databases.

One of the functional units of the delivery management server 410 or some of the processes thereof may be embodied by the central server 400 or another computer connected to the network N1.

The identification information acquiring unit F11 acquires identification information of delivery vehicles which use the delivery system 1 and identification information of users of the delivery vehicles. For example, the identification information acquiring unit F11 may acquire identification information of the vehicles and the users which are input from the users through an application for using a service provided by the delivery system 1 (hereinafter also referred to as a predetermined application). The delivery vehicles which use the delivery system 1 are the first vehicle 10 and the second vehicle 20 as described above. The delivery vehicles which use the delivery system 1 may be vehicles which are owned by a delivery company using the delivery system 1 or may be vehicles which are owned by general users using the delivery system 1. Then, the identification information acquiring unit F11 registers the acquired identification information in the identification information database D11. Delivery schedules of delivery objects in the delivery vehicles along with the identification information of the delivery vehicles may be registered in the identification information database D11 as will be described later.

The notification information generating unit F12 generates predetermined information which is notified to the first user and the second user. The predetermined information is information including position information of a predetermined meeting place as described above, and the predetermined information will be referred to as notification information in the following description. The notification information generating unit F12 can generate notification information based on information registered in the identification information database D11 and information registered in the luggage information database D12, and details thereof will be described later. The notification information transmitting unit F13 notifies the first user and the second user of the notification information generated by the notification information generating unit F12. The notification information transmitting unit F13 can notify the notification information to the first user and the second user by transmitting the notification information to the first user terminal 200 and the second user terminal 210. Alternatively, the notification information transmitting unit F13 can notify the notification information to the first user and the second user, for example, via a navigation system of an onboard unit by transmitting the notification information to the first onboard unit 10A and the second onboard unit 20A.

The authentication information requesting unit F14 requests the central server 400 to transmit authentication information for locking and unlocking the first vehicle 10 to the second user terminal 210 and/or to transmit authentication information for locking and unlocking the second vehicle 20 to the first user terminal 200.

The identification information database D11 is a database that stores identification information of delivery vehicles which use the delivery system 1 and identification information of users of the delivery vehicles. The identification information database D11 includes an identification information table illustrated in FIG. 4. Information which is stored in the identification information table is not limited to the example illustrated in FIG. 4 and addition, modification, and deletion of fields may be appropriately performed thereon.

The identification information table illustrated in FIG. 4 includes fields of user ID, classification, name (and contact information), vehicle ID, vehicle number, vehicle model, color, position information, and schedule. The user ID is an ID for identifying a user. The classification is a classification indicating the user's attributes, and the user attributes are one of a delivery company and a general user. The contact information is contact information of the user. The name is a name of the user. The contact information is, for example, a mobile phone number or an e-mail address of the user. The vehicle ID is an ID for identifying a vehicle. The vehicle number, the vehicle model, and the color are information which is used to specify the vehicle and a vehicle ID is set for each vehicle number. The vehicle ID is correlated with authentication information for the vehicle in advance in the central server 400. The position information is a location of the vehicle, and may be an address which is registered by the user of which the user attributes are general user. Alternatively, the position information may be position information which is calculated by a GPS device (not illustrated) disposed in the onboard unit by receiving signals from GPS satellites. The schedule is a delivery schedule of luggage for each vehicle and is information which is stored for a user of which the user attributes are delivery company.

The luggage information database D12 is a database that stores information on luggage. The luggage information database D12 includes a luggage information table illustrated in FIG. 5. Information which is stored in the luggage information table is not limited to the example illustrated in FIG. 5 and addition, modification, and deletion of fields may be appropriately performed thereon.

The luggage information table illustrated in FIG. 5 includes fields of luggage ID, classification, delivery source, delivery destination, and designated date and time. The luggage ID is an identification ID which is allocated to each luggage which is delivered using the delivery system 1. The classification is a classification of luggage, and information such as article name, fragile, raw food, precision instrument, or keep refrigerated is stored therein. The delivery source is information of a delivery source of luggage, and this information is, for example, a sender, sender contact information, or a delivery source address. The delivery destination is information of a delivery destination of luggage, and this information is, for example, a receiver, receiver contact information, or a delivery destination address. The designated date and time is a date and time at which luggage is delivered to the delivery destination.

FIG. 6 is a diagram illustrating a functional configuration of the central server. The central server 400 includes an authentication information managing unit F21, a user information database D21, and an authentication information database D22 as functional units. The processor 401 of the central server 400 performs processes of the authentication information managing unit F21, the user information database D21, and the authentication information database D22 by executing a computer program. One of the functional units or some of the processes thereof may be embodied by a hardware circuit.

One of the functional units of the central server 400 or some of the processes thereof may be embodied by the delivery management server 410 or another computer connected to the network N1.

The authentication information managing unit F21 receives an authentication information transmission request from the delivery management server 410. The authentication information managing unit F21 receives information of a user terminal which is a destination of authentication information, identification information of a vehicle which is locked or unlocked, and identification information of a user correlated with the vehicle along with the authentication information transmission request. The authentication information managing unit F21 transmits authentication information (terminal authentication information) corresponding to the key unit of the vehicle which is locked or unlocked to the user terminal. The authentication information may be transmitted to the delivery management server 410 and then be transmitted from the delivery management server 410 to the user terminal.

The user information database D21 stores identification information of a user and identification information of the vehicle correlated with the user. The authentication information database D22 stores authentication information for the vehicle. The authentication information for the vehicle is information correlated with the identification information of the vehicle and can be set to, for example, information specific to the key unit of the onboard unit.

The first user terminal 200 and the second user terminal 210 have the same functional configuration, and thus a user terminal 220 which collectively refers to the first user terminal 200 and the second user terminal 210 will be described below. FIG. 7 illustrates a functional configuration of a user terminal. The user terminal 220 includes a notification information receiving unit F31 and an authentication processing unit F32 as functional units. The processor 221 of the user terminal 220 performs processes of the notification information receiving unit F31 and the authentication processing unit F32 by executing a computer program in the main storage unit 222. One of the functional units or some of the processes thereof may be embodied by a hardware circuit.

The notification information receiving unit F31 receives notification information transmitted from the delivery management server 410. Then, the notification information receiving unit F31 displays the received notification information on the user terminal 220. Examples of information displayed on the user terminal 220 include an address of a predetermined meeting place or a meeting time (which may be a time period having a certain period). Here, the predetermined meeting place may be displayed by an address for linking to a map application correlated with a predetermined application. In this case, a user can ascertain the predetermined meeting place on a map displayed by the map application.

The authentication processing unit F32 receives authentication information for authentication by the key unit of a vehicle. In the following description, the key unit 100 of the first vehicle 10 will be exemplified. The authentication processing unit F32 provides an interface for allowing the user to perform unlocking or locking of the vehicle using the received authentication information. The user can unlock or lock the vehicle, for example, through an operation on an authentication processing screen SC1 illustrated in FIG. 8.

Figure 8:
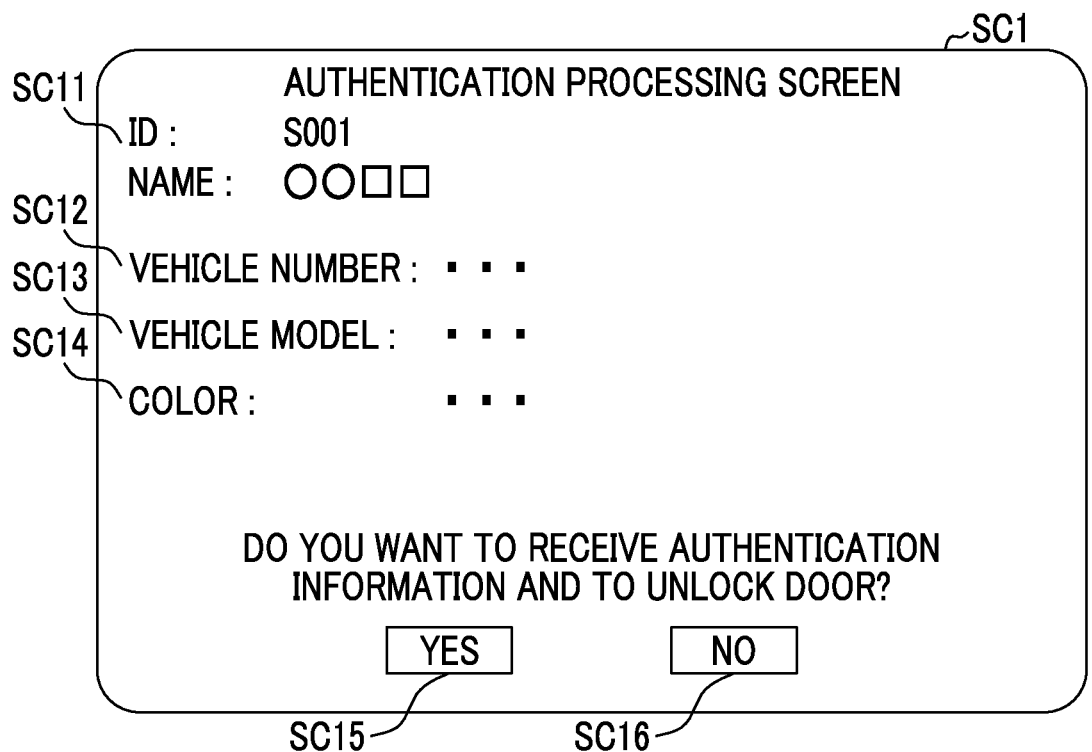
FIG. 8 is a diagram illustrating an authentication processing screen.

FIG. 8 is a diagram illustrating an authentication processing screen. The authentication processing screen SC1 illustrated in FIG. 8 is a screen for performing unlocking of the vehicle. On the authentication processing screen SC1, fields of user information SC11 (ID and name), vehicle number SC12, vehicle model SC13, color SC14, an unlocking button SC15 labeled with "YES," and a cancel button SC16 labeled with "NO" are displayed. The user can specify a vehicle based on the vehicle number SC12, the vehicle model SC13, and the color SC14 appearing on the authentication processing screen SC1.

When the unlocking button SC15 is pressed, the short-range communication unit 103 of the key unit 100 receives authentication information from the user terminal 220. The authentication unit 1042 of the key unit 100 performs an authentication process by comparing the received authentication information with authentication information stored in the storage unit 1041. When the authentication has succeeded, the authentication unit 1042 of the key unit 100 transmits an unlocking signal to the locking/unlocking device 300 along with a key ID correlated with the authentication information, and the vehicle is unlocked when the authentication of the key ID has succeeded.

Figure 9:
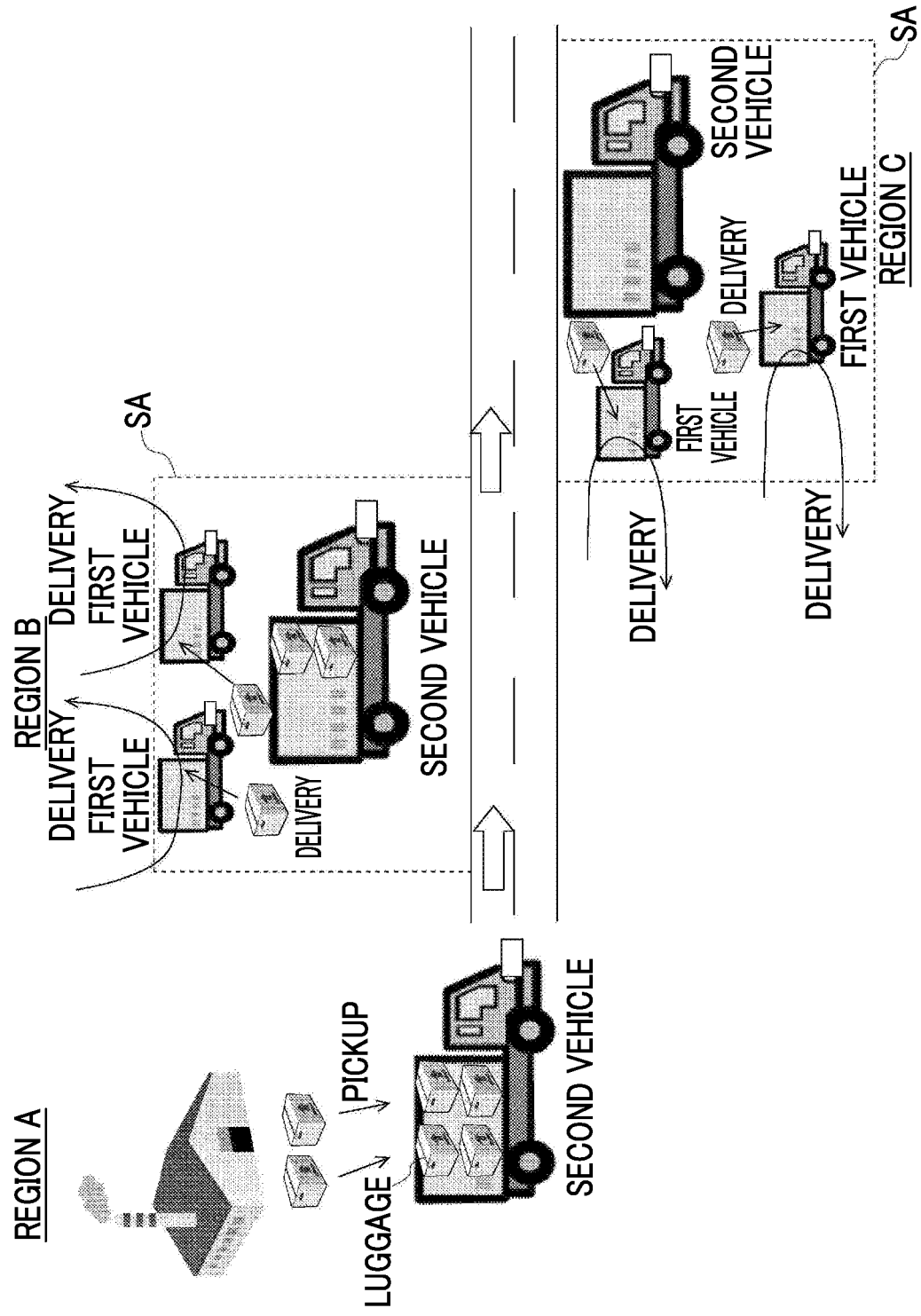
FIG. 9 is a diagram illustrating a delivery type in a delivery system according to a first embodiment.

FIG. 9 is a diagram illustrating a delivery type in the delivery system 1 according to this embodiment. In this embodiment, a second vehicle 20 delivers luggage to a plurality of first vehicles 10 at a predetermined meeting place. At this time, the central server 400 transmits authentication information for locking and unlocking a door of a cargo compartment of the second vehicle 20 to first user terminals 200 of users of the plurality of first vehicles 10. This will be described below in detail.

In the example illustrated in FIG. 9, the first vehicles 10 and the second vehicle 20 are vehicles of a delivery company, and luggage picked up into the second vehicle 20 in Region A is delivered to a predetermined delivery destination by the first vehicle 10 in Region B and is delivered to a predetermined delivery destination by the first vehicle 10 in Region C.

In this delivery type, the notification information generating unit F12 generates notification information which is notified to the first user and the second user based on delivery schedules of the first vehicle 10 and the second vehicle 20 registered in the identification information database D11 and delivery destination information of luggage registered in the luggage information database D12. Here, information of luggage picked up to the second vehicle 20 in Region A is registered in the luggage information database D12 and a delivery destination of the luggage is Region B or Region C. A delivery route in the delivery schedule of the second vehicle 20 includes Region B and Region C.

Specifically, in this embodiment, since luggage is delivered from the second vehicle 20 to a plurality of first vehicles 10 in Region B, the notification information generating unit F12 can generate notification information with a position of a predetermined meeting place as a predetermined point in Region B. In the example illustrated in FIG. 9, the notification information generating unit F12 sets a service area (SA) in Region B on a highway as the predetermined meeting place. The notification information generating unit F12 calculates a time period in which the second vehicle 20 arrives at the service area based on the delivery schedule of the second vehicle 20 and sets a meeting time period in the service area. By causing the notification information transmitting unit F13 to transmit the notification information generated in this way to the first user terminal 200 and the second user terminal 210, the first user and the second user are notified of the notification information.

The first user and the second user gather their vehicles in the service area based on the notification information received by their user terminals. The second user enters the service area from a main lane of the highway and parks the second vehicle 20 in a parking lot of the service area. The first user enters the service area, for example, from a smart interchange disposed in the service area and parks the first vehicle 10 in the parking lot of the service area. FIG. 9 illustrates an example in which the first vehicle 10 and the second vehicle 20 gather in the service area, but this embodiment is not limited to the example and the predetermined meeting place may be, for example, a parking lot of a roadside station.

As described above, since authentication information for locking and unlocking a door of a cargo compartment of the second vehicle 20 is transmitted to the first user terminals 200 of the users of the plurality of first vehicles 10 by the central server 400, the first users can lock and unlock the door of the cargo compartment of the second vehicle 20 using the authentication information received by the first user terminals 200. Specifically, the users of the plurality of first vehicles 10 can move luggage from the second vehicle 20 to the first vehicles 10 by accessing the cargo compartment of the second vehicle 20 using the authentication information. The first vehicle 10 in which delivery of luggage from the second vehicle 20 to the corresponding first vehicle 10 has been completed leaves the service area for a predetermined delivery destination in Region B. Here, the door of the cargo compartment of the second vehicle 20 parked in the parking lot in the service area is locked except when the first users access the cargo compartment, security of luggage stored in the second vehicle 20 is maintained.

In this embodiment, luggage is also delivered from the second vehicle 20 to a plurality of first vehicles 10 in Region C. In Region C, luggage is delivered in the same way as the delivery in Region B.

Figure 10:
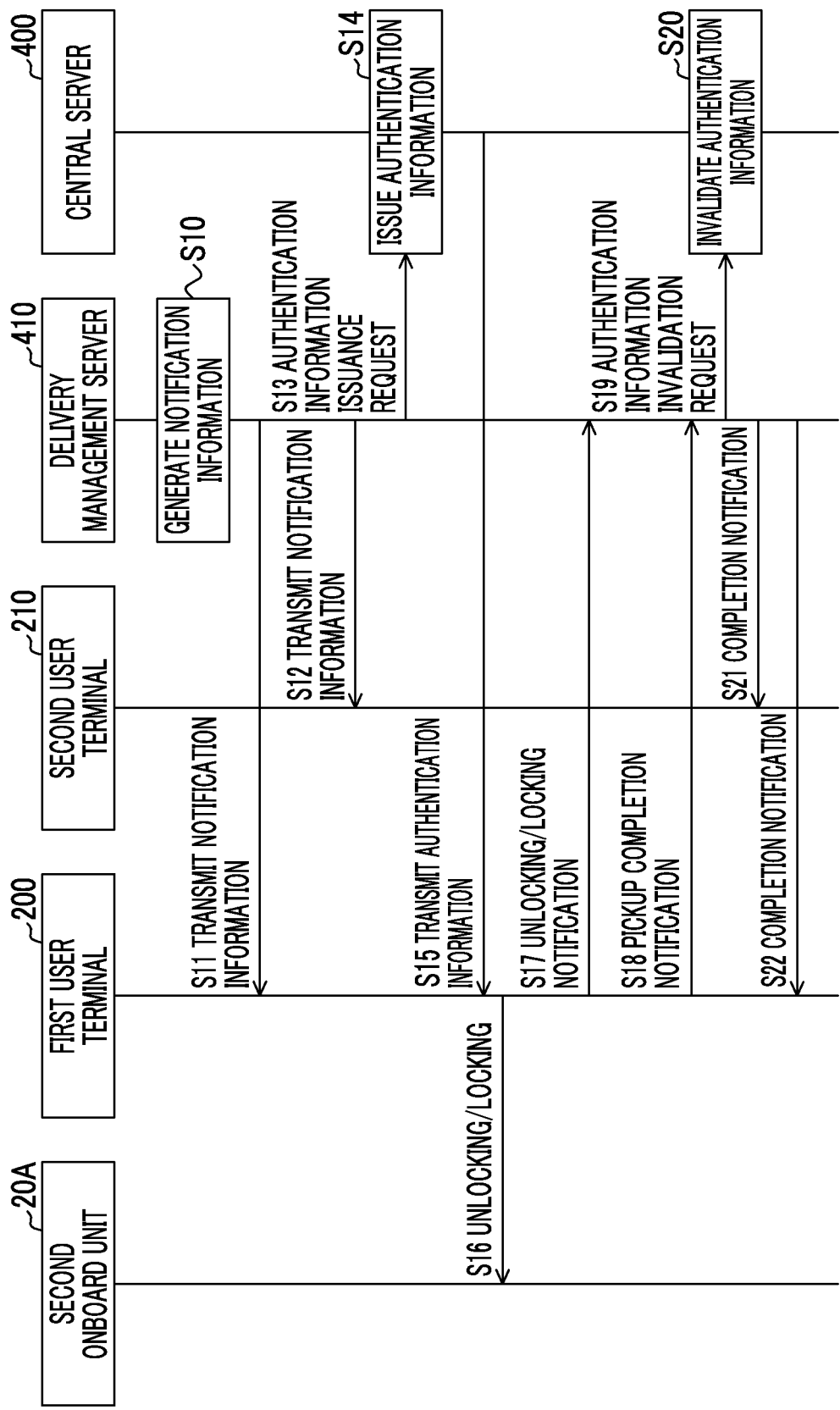
FIG. 10 is a first diagram illustrating a flow of processes in the delivery type illustrated in FIG. 9.

FIG. 10 is a diagram illustrating a flow of processes in the above-mentioned delivery type. FIG. 10 illustrates a flow of operations between the elements in the delivery system 1 and processes which are performed by the elements.

The delivery management server 410 generates notification information based on delivery schedules of the first vehicles 10 and the second vehicle 20 registered in the identification information database D11 and delivery destination information of luggage registered in the luggage information database D12 (S10). Then, the delivery management server 410 transmits the notification information to the first user terminals 200 (S11) and transmits the notification information to the second user terminal 210 (S12). Accordingly, the first users and the second user can gather their vehicles at a predetermined meeting place based on the notification information displayed on their user terminals. In this embodiment, the notification information is transmitted to the first user terminals 200 of the users of the plurality of first vehicles 10.

The delivery management server 410 transmits identification information of the second vehicle 20 and information of the first user terminal 200 which is a transmission destination of authentication information to the central server 400 and requests the central server to transmit the authentication information to the first user terminal 200 (S13). When the request for transmission of authentication information has been received, the central server 400 issues authentication information based on the received identification information of the second vehicle 20 (S14). The central server 400 transmits the issued authentication information to the first user terminal 200 (S15). In this embodiment, the authentication information is transmitted to the first user terminals 200 of the users of the plurality of first vehicles 10.

The first user terminal 200 transmits the authentication information transmitted to the first user terminal 200 to the second onboard unit 20A (a key unit included in the onboard unit) of the second vehicle 20 in which luggage is accommodated and requests unlocking. When the authentication of the first user terminal 200 using the authentication information has succeeded, the second vehicle 20 is unlocked (S16). Accordingly, the first user can access the cargo compartment of the second vehicle 20. The first user can pick up the luggage from the cargo compartment of the second vehicle 20 and then lock the second vehicle 20 (S16).

When the first user performs an unlocking/locking operation, the delivery management server 410 receives a unlocking/locking notification from the first user terminal 200 (S17). Then, when the first user completes pickup of luggage from the cargo compartment of the second vehicle 20, the first user can transmit a pickup completion notification to the delivery management server 410 using a predetermined application in the first user terminal 200 (S18).

When the pickup completion notification has been received, the delivery management server 410 requests the central server 400 to invalidate the authentication information transmitted in S15 (S19). In this embodiment, when the pickup completion notification has been received from all the first users which have been notified of the notification information, the delivery management server 410 transmits the request for invalidation. Then, the central server 400 invalidates the authentication information (S20). The delivery management server 410 or the first user terminal 200 can invalidate the authentication information by deleting the authentication information received from the central server 400 in response to an instruction from the central server 400. Then, when invalidation of the authentication information is completed, a completion notification is transmitted from the delivery management server 410 to the first user terminals 200 and the second user terminal 210 (S21 and S22).

In this embodiment, the central server 400 may transmit authentication information for locking and unlocking doors of the cargo compartments of a plurality of first vehicles 10 to the second user terminal 210. In this case, the second user can lock and unlock the doors of the cargo compartments of the plurality of first vehicles 10 using the authentication information received by the second user terminal 210. Specifically, the second user can move luggage from the second vehicle 20 to the first vehicles 10 by accessing the cargo compartments of the plurality of first vehicles 10 using the authentication information.

A flow of processes at this time will be described below with reference to FIG. 11. In the following description, substantially the same flow of operations and the same processes as described above with reference to FIG. 10 will be referred to by the same reference signs and detailed description thereof will not be repeated.

The delivery management server 410 transmits identification information of first vehicles 10 and information of a second user terminal 210 which is a transmission destination of authentication information to the central server 400 and requests the central server 400 to transmit authentication information to the second user terminal 210 (S131). When the request for transmission of authentication information has been received, the central server 400 issues authentication information based on the received identification information of the first vehicles 10 (S141). The central server 400 transmits the issued authentication information to the second user terminal 210 (S151). Here, authentication information which varies depending on a plurality of first vehicles 10 may be transmitted to the second user terminal 210 or authentication information for a plurality of first vehicles 10 may be transmitted as a single piece of information to the second user terminal 210.

The second user terminal 210 transmits the authentication information transmitted to the second user terminal 210 to a first onboard unit 10A of a first vehicle 10 (a key unit included in the onboard unit) which delivers luggage and requests unlocking. When authentication of the second user terminal 210 using the authentication information has succeeded, the first vehicle 10 is unlocked (S161). Accordingly, the second user can access the cargo compartment of the first vehicle 10. Then, when luggage is delivered to the cargo compartment of the first vehicle 10, the second user can lock the first vehicle 10 (S161).

When the second user performs an unlocking/locking operation, the delivery management server 410 receives an unlocking/locking notification from the second user terminal

210 (S171). Then, when delivery of luggage to the cargo compartments of the plurality of first vehicles 10 has been completed, the second user can transmit a delivery completion notification to the delivery management server 410 using a predetermined application in the second user terminal 210 (S181).

When the delivery completion notification is received, the delivery management server 410 requests the central server 400 to invalidate the authentication information transmitted in S151 (S191) Then, the central server 400 invalidates the authentication information (S201). The delivery management server 410 or the second user terminal 210 can invalidate the authentication information by deleting the authentication information received from the central server 400 in response to an instruction from the central server 400.

In the above-mentioned delivery system 1, since a plurality of first vehicles 10 gather at the location of the second vehicle 20 in which picked-up luggage is accommodated, it is possible to realize the same function as a delivery center at an arbitrary point of each region without providing a fixed delivery center in the regions. By issuing authentication information for locking and unlocking a door of a cargo compartment of the second vehicle 20 to the first user terminals 200 of the users of the plurality of first vehicles 10 or by issuing authentication information for locking and unlocking the doors of the cargo compartments of the plurality of first vehicles 10 to the second user terminal 210, it is possible to smoothly deliver luggage from the second vehicle 20 to the first vehicles 10 and thus to efficiently deliver luggage.

A program causing a computer or other machine or device (hereinafter referred to as a computer or the like) to execute any one of the above-mentioned functions can be recorded on a recording medium which can be read by a computer or the like. By causing the computer or the like to read and execute the program on the recording medium, the functions can be provided.

Here, a recording medium which can be read by a computer or the like refers to a non-transitory recording medium which can store information such as data or programs in an electrical, magnetic, optical, mechanical, or chemical action and be read by the computer or the like. Examples of the recording medium which can be detached from the computer or the like include a flexible disk, a magneto-optical disk, a CD-ROM, a CD-R/W, a DVD, a Blu-ray disc, a DAT, a 8 mm tape, and a memory card such as a flash memory. Examples of the recording medium which is fixed to the computer or the like include a hard disk and a read only memory (ROM). A solid state drive (SSD) can be used as a recording medium which can be detached from the computer or the like and can also be used as a recording medium which is fixed to the computer or the like.

In description of the hardware configuration in the first embodiment, when an authentication process in the key unit 100 has succeeded, a vehicle is unlocked by the locking/unlocking device 300. However, in this modified example, the locking/unlocking device 300 may perform the processes in the key unit 100. That is, the locking/unlocking device 300 may include a control unit for authenticating authentication information received from a user terminal, and the control unit may transmit an unlocking command or a locking command to the body ECU 304 via an onboard network such as a CAN when authentication of the user terminal has succeeded.

With the delivery system 1 according to this modified example, it is possible to efficiently deliver luggage with a simple configuration without installing the key unit 100.

In description of the hardware configuration in the first embodiment, a user terminal receives authentication information from the central server 400, a locking/unlocking signal is transmitted from the key unit 100 to the locking/unlocking device 300 when the user terminal has been authenticated based on the received authentication information, and the vehicle is locked and unlocked. In this modified example, the authentication information includes information of a key ID for locking/unlocking the vehicle, not information for authenticating the user terminal.

In this case, the user terminal receives authentication information including a key ID for locking/unlocking a vehicle from the central server 400, and transmits the received key ID along with a locking/unlocking signal to the locking/unlocking device 300. The locking/unlocking device 300 compares the received key ID with a key ID stored in advance in the locking/unlocking device 300 and locks and unlocks the vehicle when both key IDS coincide with each other. The key ID is transmitted and received in an encrypted state between the user terminal and the central server 400 or the locking/unlocking device 300. The authentication information managing unit F21 of the central server 400 may generate a one-time key, for example, by encrypting the key ID using a predetermined algorithm along with time information. The locking/unlocking device 300 decrypts the received one-time key using the same algorithm as in the central server 400 and compares the decrypted one-time key with the key ID stored in advance in the locking/unlocking device 300. The one-time key may be transmitted from the central server 400 to the delivery management server 410 and may be transmitted from the delivery management server 410 to the user terminal.

By including the one-time key generated from the key ID and the time information in the authentication information, the central server 400 can generate authentication information which is temporarily valid for each request for access and transmit the generated authentication information to the user terminal.

In description of the hardware configuration in the first embodiment and Modified Example 2 of the first embodiment, the central server 400 transmits authentication information for a user terminal corresponding to fixed authentication information specific to the key unit 100 or a key ID stored in advance in the locking/unlocking device 300 of the vehicle to the user terminal. However, authentication information transmitted between the user terminal and the key unit 100 is not limited thereto. In this modified example, for example, the central server 400 may Generate new authentication information and issue the new authentication information to the user terminal whenever a request for issuance of authentication information is received. In this case, the central server 400 can transmit authentication information for the key unit 100 corresponding to the new authentication information for the user terminal to the key unit 100 via an onboard communication device (not illustrated) which can communicate with the network N1 connected to the central server 400 and store the authentication information therein. In this case, the key unit 100 can be connected to the onboard communication device via the CAN or the like. Here, the central server 400 may generate new authentication information from identification information for identifying the vehicle and time information and transmit the new authentication information and the time information to the user terminal. In this case, the key unit 100 can generate new authentication information using the same algorithm as in the central server 400. The user terminal can transmit the new authentication information and the time information to the key unit 100 and be subjected to authentication.

In the above-mentioned first embodiment, a second vehicle 20 delivers luggage to a plurality of first vehicles 10 at a predetermined meeting place. On the other hand, in this embodiment, a first vehicle 10 picks up luggage from a plurality of second vehicles 20 at a predetermined meeting place. At this time, the central server 400 transmits authentication information for locking and unlocking a door of a cargo compartment of the first vehicle 10 to second user terminals 210 of users of the plurality of second vehicles 20. This will be described below in detail.

Figure 12:
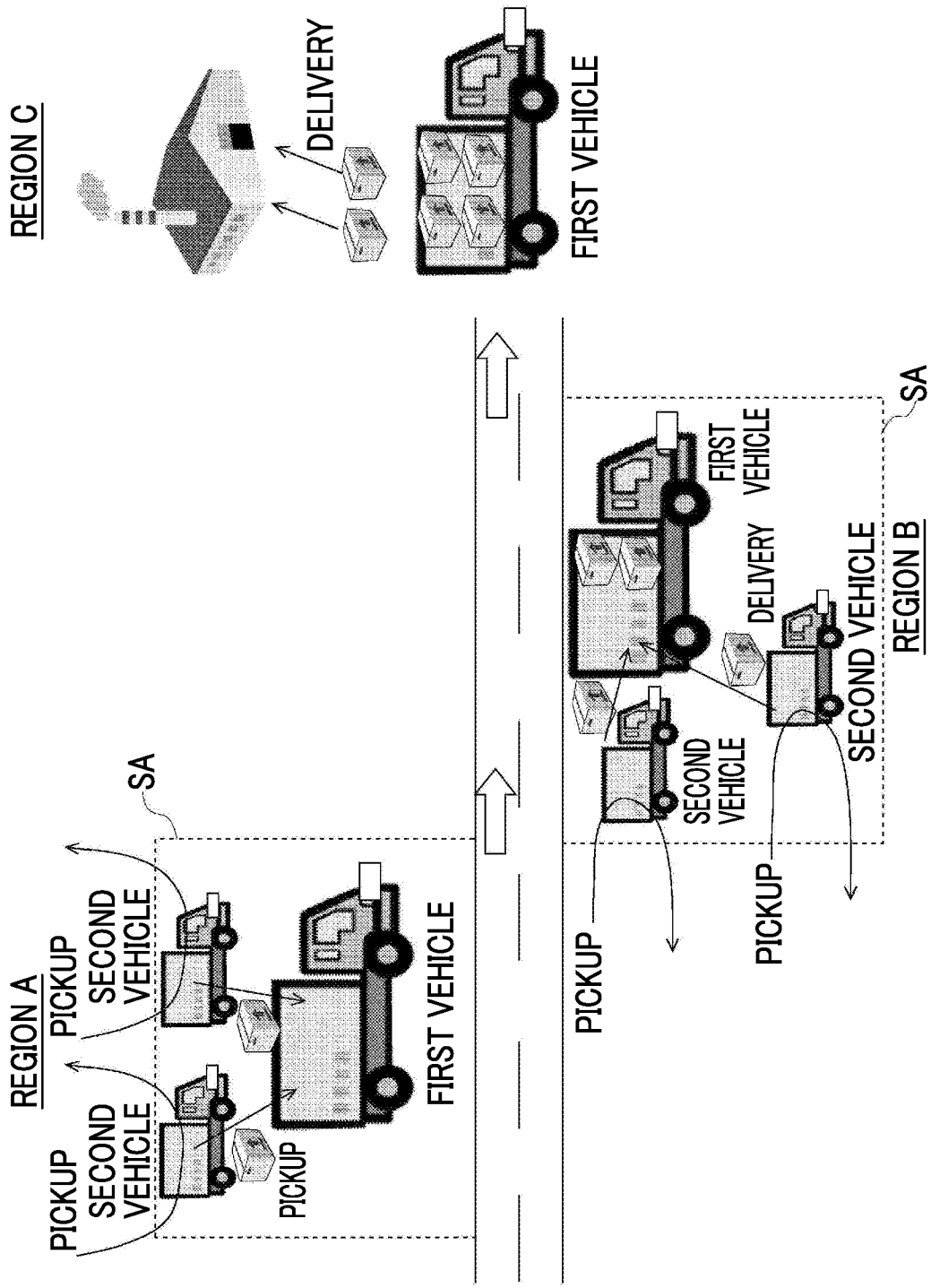
FIG. 12 is a diagram illustrating a delivery type in a delivery system according to a second embodiment.

FIG. 12 is a diagram illustrating a delivery type in the delivery system 1 according to this embodiment. In the example illustrated in FIG. 12, a first vehicle 10 and a second vehicle 20 are vehicles of a delivery company, and luggage picked up into the second vehicle 20 in Region A is delivered to the first vehicle 10 in Region A, luggage picked up into the second vehicle 20 in Region B is delivered to the first vehicle 10 in Region B, and the luggage is delivered to a predetermined delivery destination by the first vehicle 10 in Region C.

In this delivery type, the notification information generating unit F12 generates notification information based on delivery schedules of the first vehicle 10 and the second vehicles 20 registered in the identification information database D11 and delivery destination information of luggage registered in the luggage information database D12, and the notification information transmitting unit F13 transmits the generated notification information to the first user terminal 200 and the second user terminals 210.

A second user can lock and unlock the door of the cargo compartment of the first vehicle 10 using authentication information received by the second user terminal 210. Specifically, users of a plurality of second vehicles 20 can move luggage from the second vehicles 20 to the first vehicle 10 by accessing the cargo compartment of the first vehicle 10 using the authentication information. When delivery of luggage from the second vehicles 20 to the first vehicle 10 is completed, the first vehicle 10 leaves for a next meeting place or a predetermined delivery destination.

Figure 11:
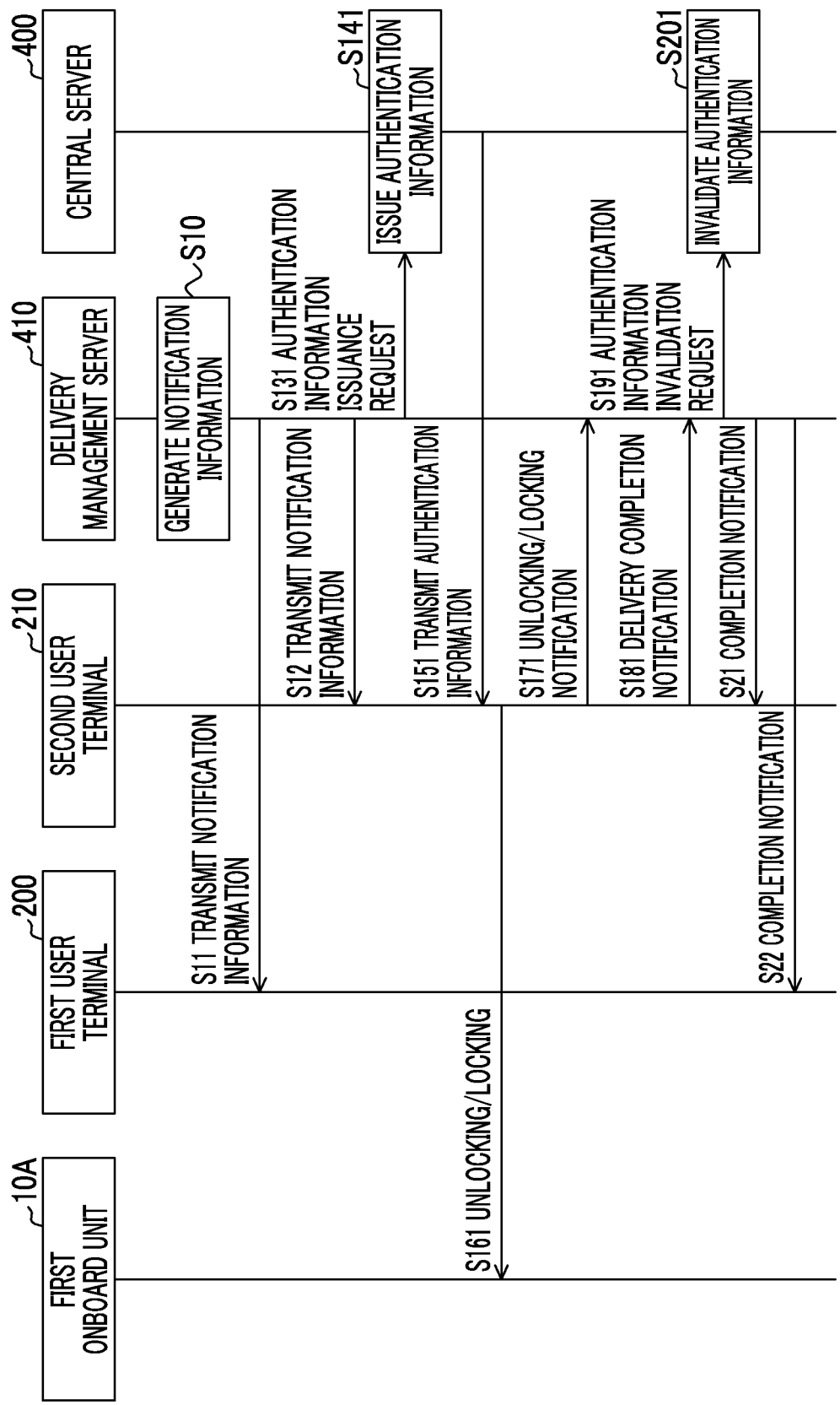
FIG. 11 is a second diagram illustrating a flow of processes in the delivery type illustrated in FIG. 9.

With reference to FIG. 11 for this, the delivery management server 410 transmits identification information of the first vehicle 10 and information of the second user terminals 210 which is a transmission destination of authentication information to the central server 400 and requests the central server 400 to transmit authentication information to the second user terminals 210 (S131). When the request for transmission of authentication information has been received, the central server 400 issues authentication information based on the received identification information of the first vehicle 10 (S141). The central server 400 transmits the issued authentication information to the second user terminals 210 (S151). In this embodiment, the authentication information is transmitted to the second user terminals 210 of the users of the plurality of second vehicles 20.

When a delivery completion notification (S181) from the second user has been received, the delivery management server 410 requests the central server 400 to invalidate the authentication information transmitted in S151 (S191). In this embodiment, when the delivery completion notification has been received from all the second users who have been notified of the notification information, the delivery management server 410 transmits the request. Then, the central server 400 invalidates the authentication information (S201).

In this embodiment, the central server 400 may transmit authentication information for locking and unlocking the doors of the cargo compartments of the plurality of second vehicles 20 to the first user terminal 200. In this case, the first user can lock and unlock the doors of the cargo compartments of the plurality of second vehicles 20 using the authentication information received by the first user terminal 200. Specifically, the first user can move luggage from the second vehicles 20 to the first vehicle 10 by accessing the cargo compartments of the plurality of second vehicles 20 using the authentication information.

With reference to FIG. 10 for this, the delivery management server 410 transmits identification information of the second vehicles 20 and information of the first user terminal 200 which is a transmission destination of authentication information to the central server 400 and requests the central server 400 to transmit authentication information to the first user terminal 200 (S13). When the request for transmission of authentication information has been received, the central server 400 issues authentication information based on the received identification information of the second vehicles 20 (S14). The central server 400 transmits the issued authentication information to the first user terminal 200 (S15). Authentication information which varies depending on a plurality of second vehicles 20 may be transmitted to the first user terminal 200 or authentication information for the plurality of second vehicles 20 may be transmitted as a single piece of information to the first user terminal 200.

Then, when pickup of luggage from the plurality of second vehicles 20 by the first user has been completed and a pickup completion notification has been transmitted to the delivery management server 410 (S18), the delivery management server 410 requests the central server 400 to invalidate the authentication information transmitted in S15 (S19). Then, the central server 400 invalidates the authentication information (S20).

With the above-mentioned delivery system 1, since a plurality of second vehicles 20 to which luggage has been picked up in regions gather at the location of a first vehicle 10 that delivers luggage to a predetermined delivery destination, it is possible to realize the same function as a delivery center at an arbitrary point in each region without providing a fixed delivery center in each region. By issuing authentication information for locking and unlocking the door of the cargo compartment of the first vehicle 10 to the second user terminals 210 of the users of a plurality of second vehicles 20 or issuing authentication information for locking and unlocking the doors of the cargo compartments of the plurality of second vehicles 20 to the first user terminal 200, it is possible to smoothly deliver luggage from the second vehicles 20 to the first vehicle 10 and thus to efficiently deliver luggage.

The first embodiment is an example in which a second vehicle 20 delivers luggage to a plurality of first vehicles 10, and the second embodiment is an example in which a first vehicle 10 picks up luggage from a plurality of second vehicles 20. On the other hand, this embodiment is an example in which pickup and delivery of luggage is performed between a single first vehicle 10 and a single second vehicle 20 at a predetermined meeting place. At this time, the central server 400 transmits authentication information for locking and unlocking a door of a cargo compartment of the first vehicle 10 to a second user terminal 210 and/or transmits authentication information for locking and unlocking a door of a cargo compartment of the second vehicle 20 to a first user terminal 200. This will be described below in detail.

Figure 13:
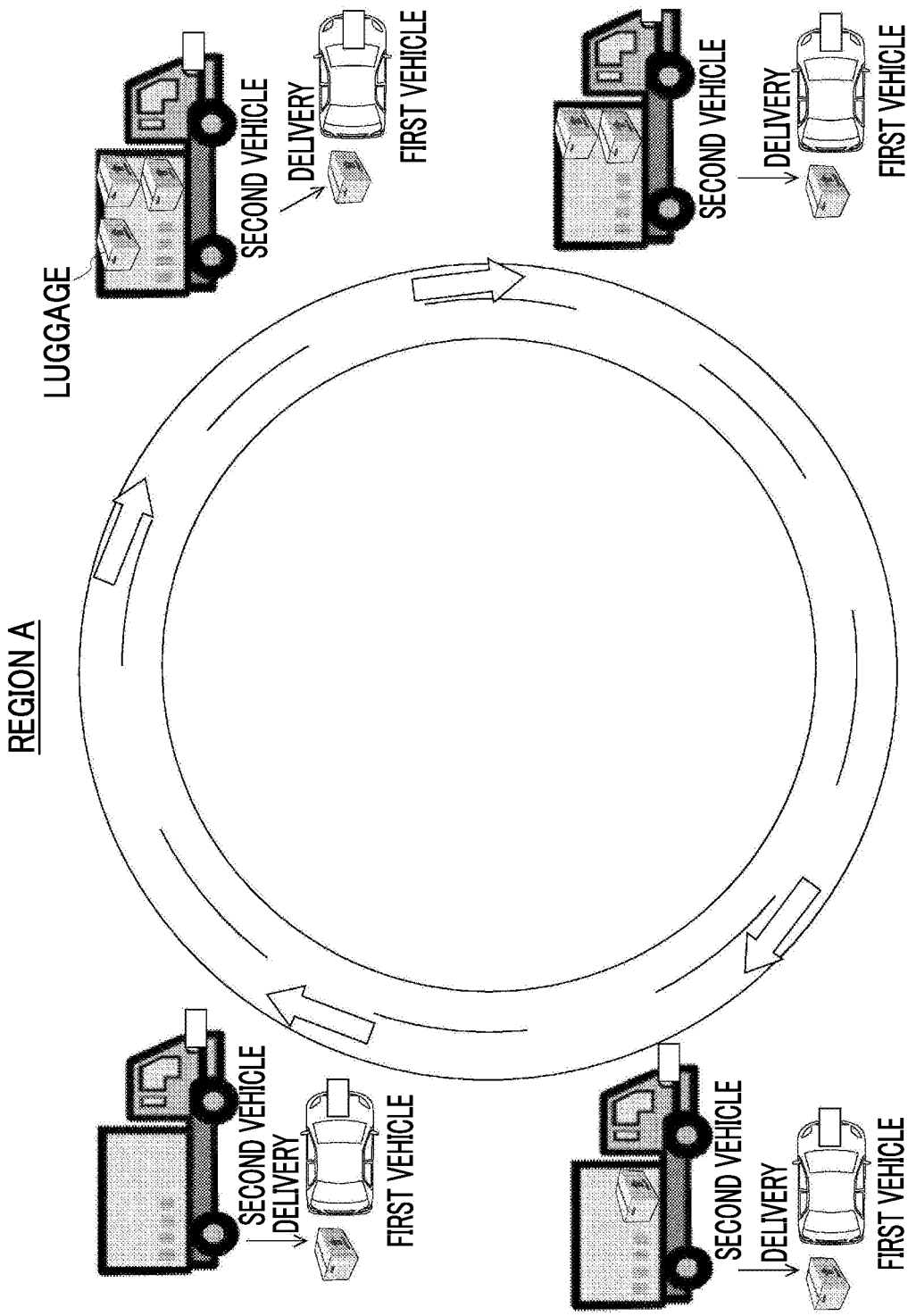
FIG. 13 is a diagram illustrating a delivery type in a delivery system according to a third embodiment.

FIG. 13 is a diagram illustrating a delivery type in a delivery system 1 according to this embodiment. In the example illustrated in FIG. 13, the first vehicle 10 is a vehicle of a general user and the second vehicle 20 is a vehicle of a delivery company. Here, the second vehicle 20 is a vehicle that circulates in Region A. The first vehicle 10 is a vehicle which is owned by a receiver of luggage accommodated in the second vehicle 20. By causing the first vehicle 10 and the second vehicle 20 to gather at a predetermined meeting place in Region A, luggage accommodated in the second vehicle 20 is delivered to the first vehicle 10, and this luggage is delivered to a predetermined delivery destination (a location of the first user) by the first vehicle 10. In this embodiment, since pickup and delivery of luggage is performed between the single first vehicle 10 and the single second vehicle 20, even a relatively small parking lot can be used as a predetermined meeting place.

In this delivery type, the notification information generating unit F12 generates notification information based on delivery destination information of luggage registered in the luggage information database D12 and position information of current positions of the first vehicle 10 and the second vehicle 20. Specifically, the notification information generating unit F12 generates the notification information such that a distance from the current position of the first vehicle 10 to a predetermined meeting place and a distance from the current position of the second vehicle 20 to the predetermined meeting place are substantially equal. Alternatively, the notification information generating unit F12 may generate the notification information such that the distance from the current position of one vehicle to the predetermined meeting place is shorter than the distance from the current position of the other vehicle to the predetermined meeting place. This embodiment is not limited thereto, and the notification information generating unit F12 may generate the notification information by selecting an arbitrary point from a plurality of predetermined points as the predetermined meeting place.

The first user and the second user cause their vehicles to gather at the predetermined meeting place based on the notification information which has been generated by the notification information generating unit F12 and has been transmitted by the notification information transmitting unit F13. At the predetermined meeting place, the first user can lock and unlock the door of the cargo compartment of the second vehicle 20 using authentication information received by the first user terminal 200. The second user can lock and unlock the door of the cargo compartment of the first vehicle 10 using authentication information received by the second user terminal 210. According to this configuration, since luggage can be smoothly delivered from the second vehicle 20 to the first vehicle 10 at the predetermined meeting place without depending on a location of a delivery center, it is possible to efficiently deliver luggage.

In the example illustrated in FIG. 13, luggage is delivered from the second vehicle 20 which is a vehicle of a delivery company circulating in Region A to the first vehicle 10 which is a vehicle of a general user, but luggage may be delivered from the second vehicle 20 which is a vehicle of a general user to the first vehicle 10 which is a vehicle of a delivery company circulating in Region A in this embodiment.

In the first embodiment and the second embodiment, for example, the first vehicle 10 and the second vehicle 20 are designated by the delivery management server 410, for example, based on delivery schedules registered in the identification information database D11 and delivery destination information of luggage registered in the luggage information database D12. In the third embodiment, a vehicle of a general user is a vehicle which is owned by a receiver of the luggage or a sender of the luggage. On the other hand, this embodiment is an example in which a vehicle of a predetermined user is used as the first vehicle 10. A predetermined user is a part-time user who is a member of a delivery company but does not work full-time. Alternatively, a predetermined user is, for example, a general user using the delivery system 1 and is a general user who is neither a receiver of luggage nor a sender of luggage. When luggage is delivered to a predetermined delivery destination by a general user, luggage may be sent, for example, in a predetermined home delivery box in consideration of privacy of a receiver of the luggage.

Figure 14:
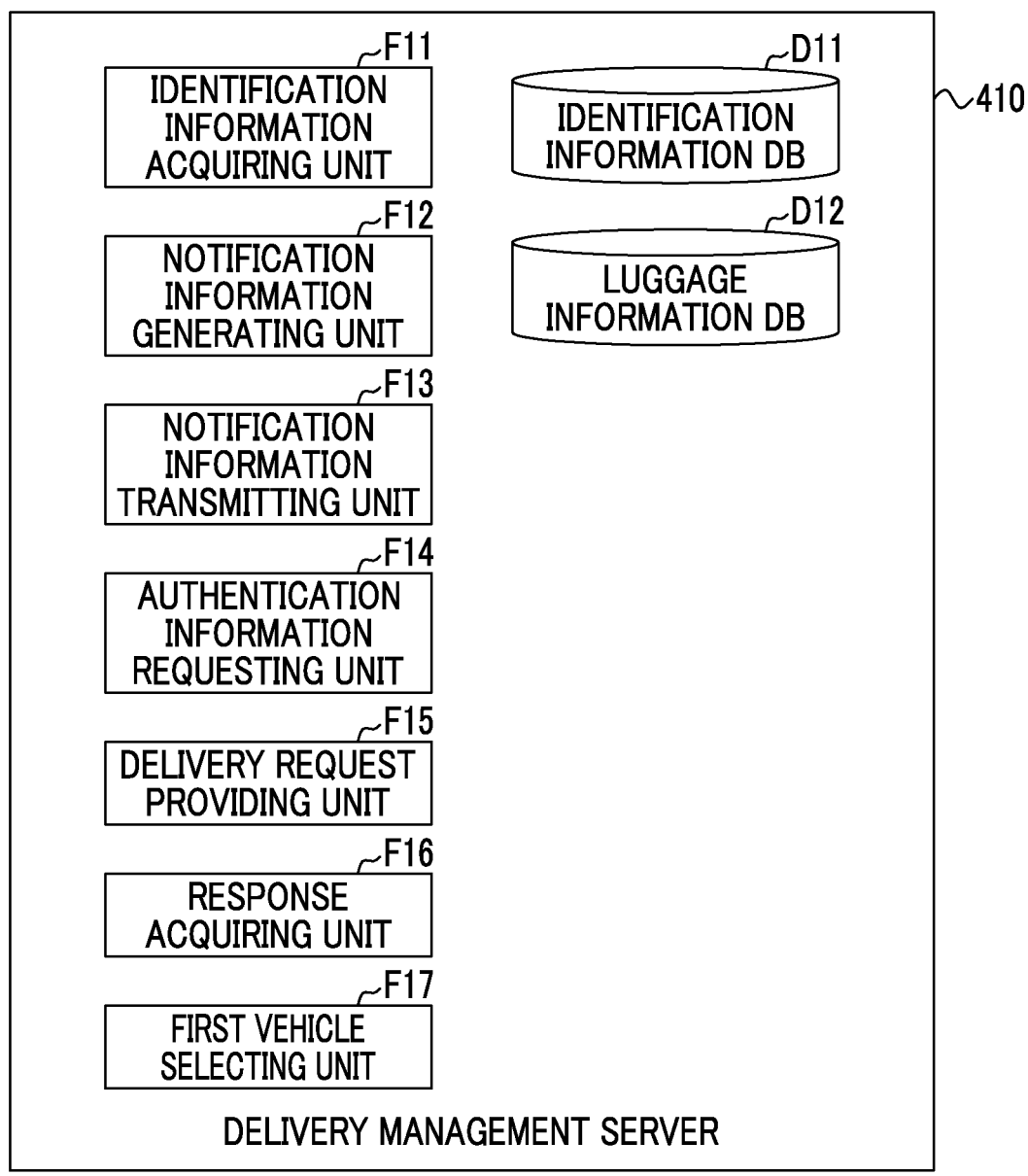
FIG. 14 is a second diagram illustrating a functional configuration of the delivery management server.

As illustrated in FIG. 14, the delivery management server 410 in this embodiment includes a delivery request providing unit F15, a response acquiring unit F16, and a first vehicle selecting unit F17 in addition to an identification information acquiring unit F11, a notification information generating unit F12, a notification information transmitting unit F13, an authentication information requesting unit F14, an identification information database D11, and a luggage information database D12. The processor 411 of the delivery management server 410 performs the processes of the identification information acquiring unit F11, the notification information generating unit F12, the notification information transmitting unit F13, the authentication information requesting unit F14, the delivery request providing unit F15, the response acquiring unit F16, and the first vehicle selecting unit F17 by executing a computer program in the main storage unit 412.

The delivery request providing unit F15 generates information of a request for delivery of luggage to a predetermined delivery destination (hereinafter referred to as delivery request information). The delivery request providing unit F15 generates delivery request information based on information on luggage registered in the luggage information database D12, and the delivery request information includes, for example, classification of luggage, a delivery source, a delivery destination, and a designated delivery date and time. The delivery request providing unit F15 provides the generated delivery request information to a plurality of predetermined users who use the delivery system 1. For example, the delivery request providing unit F15 transmits the delivery request information to terminals of the users through e-mails or the like. The delivery request providing unit F15 may screen the predetermined users who are provided with the delivery request information to a certain extent based on identification information of users registered in the identification information database D11 (for example, screen the users who are provided with the delivery request information based on an address of a delivery destination of luggage and addresses of the users) and transmit the delivery request information to terminals of the screened users. Alternatively, the delivery request providing unit F15 may provide the delivery request information to a plurality of predetermined users by displaying the delivery request information as a list on a web site.

The response acquiring unit F16 acquires a response from a user in response to the delivery request information from a plurality of users who has been provided with the delivery request information. By allowing a user who has been provided with the delivery request information to respond to an e-mail transmitted by the delivery request providing unit F15 or by transmitting a response from a user in response to the delivery request information to the delivery management server 410 by inputting a response to a predetermined application, the response acquiring unit F16 can acquire the response. The response from a user includes identification information of the user.

The first vehicle selecting unit F17 extracts a user having transmitted a response indicating agreement about the delivery request information based on the response information acquired by the response acquiring unit F16. Then, the first vehicle selecting unit F17 selects a user to who delivery of luggage to a predetermined delivery destination is actually to be requested from the extracted users. Since the selected user delivers luggage, which has been delivered from the second vehicle 20 to the cargo compartment of the user's vehicle, to the predetermined delivery destination using the user's vehicle, the vehicle of the selected user serves as the first vehicle 10. Here, the first vehicle selecting unit F17 can select a user to who delivery of luggage to a predetermined delivery destination is actually to be requested based on the current position of the vehicle of the extracted user and the current position of the second vehicle 20. The position information of the vehicles can be acquired using GPS devices included in onboard units of the vehicles.

Figure 15:
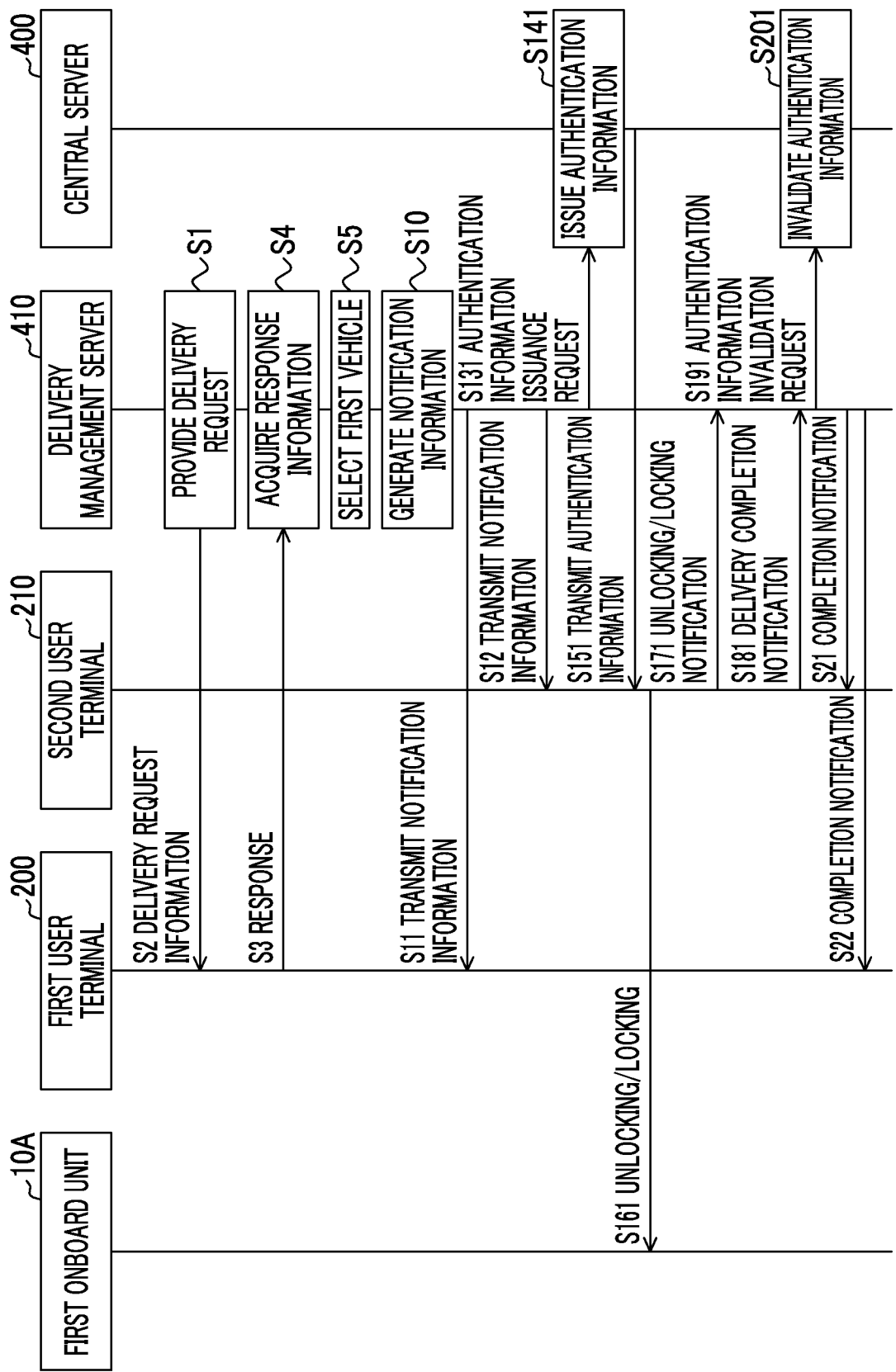
FIG. 15 is a diagram illustrating a flow of processes in a delivery system according to a fourth embodiment.

A flow of processes in the delivery system 1 according to this embodiment will be described below. FIG. 15 is a diagram illustrating a flow of processes in the delivery system 1 according to this embodiment. FIG. 15 illustrates a flow of operations between the elements in the delivery system 1 and processes which are performed by the elements. In the following description, substantially the same flow of operations and the same processes as described above with reference to FIGS. 10 and 11 will be referred to by the same reference signs and detailed description thereof will not be repeated.

The delivery management server 410 generates delivery request information and provides the delivery request information to a plurality of first users who uses the delivery system 1 (S1). A first user who is mentioned herein is the predetermined user, and all the first users who have been provided with the delivery request information do not actually deliver luggage to a predetermined delivery destination.

The first users transmit a response to the delivery request information (S2) transmitted to the first user terminals 200 (S3). Then, the delivery management server 410 acquires response information (S4). The delivery management server 410 selects a first vehicle 10 based on the response information acquired in S4 as described above. The first vehicle 10 which is selected in S5 is a vehicle which actually delivers luggage to a predetermined delivery destination.

Here, in a process of generating notification information in S10, notification information may be generated with a place at which the first vehicle 10 selected in S5 is parked as a predetermined meeting place. In this case, the second user causes the first vehicle 10 and the second vehicle 20 to gather at the place at which the first vehicle 10 is parked based on the notification information (S12). Then, the second user locks and unlocks the door of the cargo compartment of the parked first vehicle 10 using the authentication information (S151) received by the second user terminal 210 (S161), and delivers luggage from the second vehicle 20 to the first vehicle 10. The first user who has received a completion notification (S22) delivers luggage to the predetermined delivery destination using the first vehicle 10 at a designated delivery date and time. According to this configuration, since the first vehicle 10 and the second vehicle 20 can gather without causing the first user to move the first vehicle 10, it is possible to improve convenience for the first user.

In the above-mentioned delivery system 1, it is possible to appropriately select a user to who delivery of luggage to a predetermined delivery destination is actually to be requested from a plurality of first users who use the system and thus to efficiently deliver luggage.

In the delivery system 1 according to the above-mentioned embodiments and the modified examples, it is assumed that unlocking/locking control of only a cargo compartment door is performed and unlocking/locking control of a passenger compartment door is not performed but is maintained in a locked state, in consideration of security. In a vehicle having a body structure in which a cargo compartment and a passenger compartment are not partitioned from each other, for example, a vehicle which is called one box type, since a person can access the passenger compartment by unlocking the cargo compartment door, there is a likelihood that a user of the vehicle will have concern about security.

Therefore, in a vehicle in which the cargo compartment and the passenger compartment are not partitioned from each other, when a cargo compartment door is opened, the delivery system may capture a moving image of the interior space using a drive recorder which can also image the interior space and determine whether a person has invaded into the passenger compartment from the cargo compartment based on the captured moving image. When it is determined that a person has invaded into the passenger compartment from the cargo compartment, the delivery system performs storage of the captured moving image, operation of an onboard alarm, notification to a provider or a user, and the like. On the other hand, when it is determined that a person has not invaded into the passenger compartment, the delivery system may delete the captured moving image. Alternatively, the delivery system may transmit the captured moving image to the user terminal regardless of whether a person has invaded into the passenger compartment as a part of a user service.

What is claimed is:

1. A delivery system in which a predetermined area of a vehicle is used as a pickup and delivery place of a delivery object while the delivery object is being delivered to a predetermined delivery destination, the delivery system comprising:
    a first vehicle configured to deliver the delivery object to the predetermined delivery destination;
    a second vehicle configured to deliver the delivery object to the first vehicle; and
    an authentication information issuing device configured to perform at least one of first issuance control and second issuance control,
    wherein the first issuance control is control of issuing first authentication information to a second user terminal included in a second user device which is able to be used by a user of the second vehicle, and the first authentication information is information for locking and unlocking a predetermined area of the first vehicle, and
    wherein the second issuance control is control of issuing second authentication information to a first user terminal included in a first user device which is able to be used by a user of the first vehicle, and the second authentication information is information for locking and unlocking a predetermined area of the second vehicle.

2. The delivery system according to claim 1, further comprising a notification device configured to notify the first user device and the second user device of predetermined information such that the first vehicle and the second vehicle are able to gather at a predetermined meeting place,
wherein the predetermined information includes position information of the predetermined meeting place.

3. The delivery system according to claim 2, wherein the notification device is configured to notify the predetermined information based on position information of current locations of the first vehicle and the second vehicle.

4. The delivery system according to claim 2, wherein the notification device is configured to notify the predetermined information based on delivery schedules of the delivery object in the first vehicle and the second vehicle.

5. The delivery system according to claim 1, wherein the authentication information issuing device is configured to issue the second authentication information to first user terminals of the users of a plurality of the first vehicles when the second vehicle delivers delivery objects to a plurality of the first vehicles.

6. The delivery system according to claim 1, wherein the authentication information issuing device is configured to issue the first authentication information to the second user terminal when the second vehicle delivers delivery objects to a plurality of the first vehicles.

7. The delivery system according to claim 1, wherein the authentication information issuing device is configured to issue the first authentication information to second user terminals of the users of a plurality of the second vehicles when the first vehicle picks up delivery objects from a plurality of the second vehicles.

8. The delivery system according to claim 1, wherein the authentication information issuing device is configured to issue the second authentication information to the first user terminal when the first vehicle picks up delivery objects from a plurality of the second vehicles.

9. The delivery system according to claim 2, further comprising:
a delivery request providing device configured to provide a request for delivery of the delivery object to the predetermined delivery destination as a delivery request to the users of a plurality of the first vehicles;
a response acquiring device configured to acquire a response to the delivery request provided by the delivery request providing device from the users of the plurality of the first vehicles; and
a selection device configured to extract users of the first vehicles having transmitted a response indicating agreement about the delivery request among the responses acquired by the response acquiring device and to select a designated first vehicle which is a first vehicle to which the delivery object is actually delivered from the second vehicle among the first vehicles associated with the extracted users,
wherein the authentication information issuing device is configured to issue third authentication information for locking and unlocking the predetermined area of the designated first vehicle selected by the selection device to the second user terminal.

10. The delivery system according to claim 9, wherein the selection device is configured to select the designated first vehicle based on position information of current locations of the first vehicle and the second vehicle.

11. The delivery system according to claim 10, wherein the predetermined meeting place is a place at which the designated first vehicle selected by the selection device is parked.

12. An information processing device that controls a system in which a predetermined area of a vehicle is used as a pickup and delivery place of a delivery object while the delivery object is being delivered to a predetermined delivery destination, the information processing device comprising:
an authentication information issuing device configured to perform at least one of first issuance control and second issuance control,
wherein the first issuance control is control of issuing first authentication information to a second user terminal included in a second user device which is able to be used by a user of a second vehicle that delivers the delivery object to a first vehicle, and the first authentication information is information for locking and unlocking the predetermined area of the first vehicle that delivers the delivery object to the predetermined delivery destination, and
wherein the second issuance control is control of issuing second authentication information to a first user terminal included in a first user device which is able to be used by a user of the first vehicle, and the second authentication information is information for locking and unlocking the predetermined area of the second vehicle.

13. A control method for an information processing device that controls a system in which a predetermined area of a vehicle is used as a pickup and delivery place of a delivery object while the delivery object is being delivered to a predetermined delivery destination, the information processing device including an electronic control unit, the control method comprising:
causing the electronic control unit to perform at least one of first issuance control and second issuance control,
wherein the first issuance control is control of issuing first authentication information to a second user terminal included in a second user device which is able to be used by a user of a second vehicle that delivers the delivery object to a first vehicle, and the first authentication information is information for locking and unlocking the predetermined area of the first vehicle that delivers the delivery object to the predetermined delivery destination, and
wherein the second issuance control is control of issuing second authentication information to a first user terminal included in a first user device which is able to be used by a user of the first vehicle, and the second authentication information is information for locking and unlocking the predetermined area of the second vehicle.

14. A non-transitory recording medium storing a program that controls a system in which a predetermined area of a vehicle is used as a pickup and delivery place of a delivery object while the delivery object is being delivered to a predetermined delivery destination, the program causing a computer to perform at least one of a first issuance step and a second issuance step,
wherein the first issuance step is a step of issuing first authentication information to a second user terminal included in a second user device which is able to be used by a user of a second vehicle that delivers the delivery object to a first vehicle, and the first authentication information is information for locking and unlocking the predetermined area of the first vehicle that delivers the delivery object to the predetermined delivery destination, and
wherein the second issuance step is a step of issuing second authentication information to a first user terminal included in a first user device which is able to be used by a user of the first vehicle, and the second authentication information is information for locking and unlocking the predetermined area of the second vehicle.

* * * * *